United States Patent [19]

Ra et al.

[11] Patent Number: 5,330,395

[45] Date of Patent: * Jul. 19, 1994

[54] CONTINUOUSLY-GEARED AUTOMATIC TRANSMISSION WITH CONTROLLING BRAKES

[75] Inventors: Jong O. Ra, 24/1, 265-154, Bokwang-Dong, Yongsan-Gu, Seoul; Joon Y. Lim, Duckyong Villa Ka-204 141-2, Duckjeong-Ri, Hoecheon-Uep, Yangju-Gun, Kyungki-Do; Wan M. Yoo, Incheon, all of Rep. of Korea

[73] Assignees: Jong Oh Ra; Joon Young Lim, both of Rep. of Korea

[ * ] Notice: The portion of the term of this patent subsequent to Jun. 21, 2011 has been disclaimed.

[21] Appl. No.: 921,050

[22] Filed: Jul. 28, 1992

[30] Foreign Application Priority Data

Jul. 29, 1991 [KR] Rep. of Korea .................... 91-12992
Aug. 31, 1991 [KR] Rep. of Korea .................... 91-15169

[51] Int. Cl.⁵ ............................................. F16H 37/06
[52] U.S. Cl. ...................... 475/330; 475/150; 475/317
[58] Field of Search ................ 475/1, 2, 150, 280, 475/311, 317, 330

[56] References Cited

U.S. PATENT DOCUMENTS

| 4,010,653 | 3/1977 | Mekjian | 475/311 O |
| 4,027,552 | 6/1977 | Murakami et al. | 475/280 X |
| 5,062,823 | 11/1991 | Ra et al. | 475/330 |
| 5,141,477 | 8/1992 | Oshidari | 475/280 X |

FOREIGN PATENT DOCUMENTS

1415523 11/1975 United Kingdom .
2160598 12/1985 United Kingdom .

OTHER PUBLICATIONS

U.S. Patent App. #08/028,824 to John-Oh Ra et al. filed Jan. 22, 1993.

*Primary Examiner*—Leslie A. Braun
*Assistant Examiner*—Daniel Wittels
*Attorney, Agent, or Firm*—Merchant, Gould, Smith, Edell, Welter & Schmidt

[57] ABSTRACT

A transmission having an input shaft with an input sun gear and a reverse rotation control shaft with a reverse rotation sun gear rotatably secured to the input shaft. A first and a second carrier, terminating in an output shaft, are rotatably secured on the reverse rotation control shaft and input shaft, respectively. Locking pins interconnect the first and second carriers to enable simultaneous rotation of the carriers. Input planetary gears are in mechanical communication with the input sun gear. A reverse rotation planetary gear and an input planetary gear are interconnected and each such interconnected gear is rotatably mounted on a locking pin to enable simultaneous rotation of the interconnected gears about the locking pin. Each reverse rotation planetary gear is in mechanical communication with the reverse rotation sun gear. A low speed ring gear is rotatably secured on the second carrier. A low speed brake applies braking force to the low speed ring gear to initiate rotation of the output shaft and low speed rotation of the output shaft. A reverse rotation brake applies braking force to the reverse rotation control shaft to provide a reverse rotational output of the output shaft. An interlocking mechanism couples the rotational speed of the input shaft and the reverse rotation control shaft to provide medium and high speed rotation of the output shaft.

17 Claims, 18 Drawing Sheets

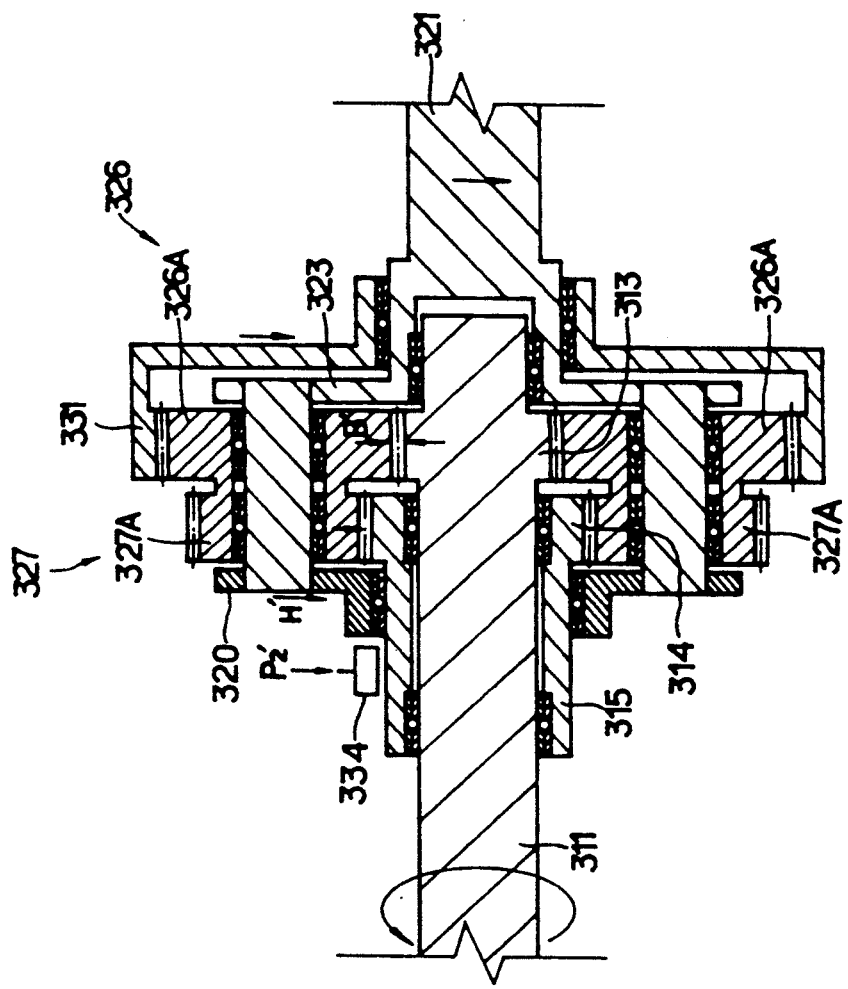

CONTINUOUSLY-GEARED AUTOMATIC TRANSMISSION WITH CONTROLLING BRAKES

BACKGROUND OF INVENTION

1. Field of the Invention

The invention relates to an automatic transmission, and more particularly, to a continuous automatic transmission constructed in such a way that power input to an input shaft can be converted and output to an output shaft without changing or disengaging gears when changing speed to attain forward motion, and output to the output shaft in a reverse rotational direction to attain a backward motion.

2. Information Disclosure Statement

A transmission changes speed by either automatic or manual selection of a predetermined gear ratio. A clutch is required for use with a manual transmission to disengage or engage the rotational power from the engine so that gears can be changed or disengaged when changing speeds to comply with the load on the output shaft. Also, shifting the gears and the operation of the clutch must be synchronized to properly effect the gear change. Such transmissions systems are large requiring a large installation space and are complicated.

To solve the above described problems U.S. Pat. No. 5,062,823 entitled: Continuously Variable Transmission with Controlling Brakes, issued on Nov. 5, 1991. However, the transmission described in the above patent document requires a separate means for attaining reverse operation, i.e. a backward motion.

Therefore, an object of the present invention is to provide a continuous automatic transmission which can solve all the above problems and which can rapidly comply with a change of a load without the need of a clutch or complicated mechanisms when engaging or disengaging a gear.

A further object of the present invention is to provide a transmission which smoothly transmits rotational force to an output shaft.

A further object of the present invention is to provide a transmission which enables smooth reverse driving.

A further object of the present invention is to provide a transmission which is easy to construct and of simple construction.

The preceding objects should be construed as merely presenting the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The continuous automatically variable transmission of the present invention is defined by the claims with specific embodiments shown in the attached drawings. For the purpose of summarizing the invention, the invention relates to a continuous automatic transmission 10 comprising an input shaft 12 for receiving rotational input from an engine, such as an automobile engine. An input sun gear 14 is secured to the input shaft 12 to enable simultaneous rotation with the input shaft 12. A medium speed control shaft 20 is coaxially and rotatably positioned on the input shaft 12 with the medium speed control shaft further including a medium speed sun gear 22 coaxially secured thereto to enable independent rotation of the medium speed control shaft 20 and the sun gear 22 about the input shaft 12. A reverse rotation control shaft 30 is coaxially and rotatably positioned on the medium speed control shaft 20 with a reverse rotation sun gear 32 coaxially secured thereto to enable independent rotation of the reverse rotation control shaft 30 and the sun gear 32 about the medium speed control shaft 20. A first carrier 40 is coaxially positioned and rotatably secured to the reverse rotation control shaft 30 to enable independent rotation about the reverse rotation control shaft 30. A second carrier 46 is coaxially positioned and rotatably secured to the input shaft to enable independent rotation about the input shaft 12 and with the second carrier 46 terminating in an output shaft 50. At least one each of locking pins 52AA, 52BB are used to interconnect and secure the first and second carriers 40, 46 together to enable simultaneous rotation of the carriers about the reverse rotation control shaft 30 and the input shaft 12, respectively. At least one input differential gear 54A is used with each input differential gear 54A being in mechanical communication with the input sun gear 14. At least one reverse rotation differential gear 58A is used with each reverse rotation differential gear 58A interconnected to an input differential gear 54A and with the interconnected reverse rotation differential gear 58A and input differential gear 54A rotatably mounted on a locking pin 52AA to enable simultaneous rotation of the interconnected gears 140 about the locking pin 52AA. Each reverse rotation differential gear 58A is in mechanical communication with the reverse rotation sun gear 32. At least one medium speed differential gears 64A is used with each medium speed differential gear 64A being rotatably secured on each locking pin 52BB. A medium speed brake means 82 applies rotational braking force to the medium speed control shaft 20 to provide medium rotational speed of the output shaft 50 relative to the rotational speed of the input shaft. A reverse rotation brake means 84 applies rotational braking force to the reverse rotation control shaft 30 to initiate and provide a reverse rotational direction output of the output shaft relative to the rotational direction of the input shaft. An interlocking means 90 directly couples the rotational speed of the input shaft 11 and the medium speed control shaft 20 to provide high speed rotation of the output shaft.

In another embodiment of the present invention, the automatic transmission 100 includes all the above described transmission elements. However, this embodiment further includes a low speed ring gear 70 which is coaxially positioned and rotatably secured to the second carrier 44 to enable independent rotation about the second carrier 44 and the low speed ring gear 70 is in mechanical communication with at least one input differential gear 54A. A low speed brake means 80 applies rotational braking force to the low speed ring gear 70 to provide low speed rotation of the output shaft 50 relative to the rotational speed of the input shaft. In this embodiment, the low speed brake means, in use, usually initiates rotational output to the output shaft, i.e. start up from a stopped or neutral state. However, the medium speed brake means can also initiate rotational output.

Preferably, in the above embodiments of the present invention a plurality of each locking pin 52A,52B, a plurality of input differential gears 54, a plurality of reverse rotation differential gears 58 and a plurality of medium speed differential gears 64 are used to provide balance and enhanced structural strength.

The above means for applying rotational braking force to shaft 20 or the low speed ring gear 70 are used to effect a change in the rotational speed of the output shaft speed, relative to the speed of the input shaft, for each step upon respective activation. However, the activation of the reverse rotation brake means 84 on shaft 30 results in the output shaft rotating in a direction opposite to the rotational direction of the input shaft and the activation of the interlocking means 90 on shafts 12 and 20, provides equal rotational speed of the input shaft and output shaft, i.e. high speed.

In yet another embodiment of the present invention, the automatic transmission 300 includes an input shaft 311 for receiving rotational input and which includes a first section 311A and a second section 311B with an input sun gear 313 secured to the input shaft 311 to enable simultaneous rotation with the input shaft 311. A reverse rotation control shaft 315 is coaxially and rotatably positioned on the input shaft 311 with the reverse rotation control shaft 315 further including a reverse rotation sun gear 314 coaxially secured thereto to enable independent rotation of the reverse rotation control shaft 315 and the sun gear 314 about the input shaft 311. A first carrier 320 is coaxially positioned and rotatably secured to the reverse rotation control shaft 315 to enable independent rotation about the reverse rotation control shaft 315. A second carrier 323 is coaxially positioned and rotatably secured to the input shaft to enable independent rotation about the input shaft 311 and with the second carrier 323 terminating in an output shaft 321. At least one locking pin 325A interconnects and secures each of the first and second carriers 320, 323 together to enable simultaneous rotation about the reverse rotation control shaft 315 and the input shaft 311, respectively. At least one input planetary gear 326A with each input planetary gear 326A being in mechanical communication with the input sun gear 313. At least one reverse rotation planetary gear 327A with each reverse rotation differential gear 327A interconnected to an input planetary gear 326A and with the interconnected reverse rotation differential gear 327A and the input differential gear 326A rotatably mounted on a locking pin 325A to enable simultaneous rotation of the interconnected gears 340 about the locking pin 325A and each reverse rotation differential gear 327A in mechanical communication with the reverse rotation sun gear 314. A low speed ring gear 331 is coaxially positioned and rotatably secured to the second carrier 323. A low speed brake means 333 applies rotational braking force to the low speed ring gear 331 to provide low speed rotation of the output shaft 321. A reverse rotation brake means 334 applies rotational braking force to the reverse rotation control shaft 315 to initiate and provide a reverse rotational output of the output shaft relative to the rotational input of the input shaft. An interlocking means 335 directly couples rotational speed of the input shaft 311 and the reverse rotation control shaft 315 to provide medium and high speed rotation of the output shaft.

Preferably, in the above embodiment of the present invention a plurality of locking pins 325, a plurality of input planetary gears 326 and a plurality of reverse rotation planetary gears 327 are used to provide balance and enhanced structural strength.

The above means for applying rotational braking force to the low speed ring gear 331 are used to effect a change in the rotational speed of the output shaft speed, relative to the speed of the input shaft upon activation. However, the activation of the reverse rotation brake means 334 on shaft 315 results in the output shaft rotating in a direction opposite to the rotational direction of the input shaft and the activation of the interlocking means 335 on shafts 311 and 315, provides equal rotational speed of the input shaft and output shaft, i.e. high speed.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 1 is a partial perspective view of the first embodiment of the present invention;

FIG. 2 is a sectional view of the first embodiment of the present invention;

FIG. 3 is a sectional view of the continuous automatic transmission according to the present invention in the neutral state;

FIG. 4 is a sectional view of the continuous automatic transmission according to the present invention in the low speed state;

FIG. 5 is a sectional view of the continuous automatic transmission according to the present invention in the medium speed state;

FIG. 6 is a sectional view of the continuous automatic transmission according to the present invention in the high speed state;

FIG. 7 is a sectional view of the continuous automatic transmission according to the present invention in the reverse driving state;

FIG. 8 is a sectional view of the second embodiment according to the present invention;

FIG. 9 is a sectional view of the second embodiment of the present invention in the neutral state;

FIG. 10 is a sectional view of the second embodiment of the present invention in the forward state;

FIG. 11 is a sectional view of the second embodiment of the present invention in the high speed state; and FIG. 12 is a sectional view of the second embodiment of the present invention in the reverse driving state;

FIGS. 13-18 illustrate the third embodiment of the continuous automatic transmission of the present invention;

FIG. 13 is a partial perspective view of the third embodiment of the present invention;

FIG. 14 is a sectional view of the third embodiment according to the present invention;

FIG. 15 is a sectional view of the third embodiment of the present invention in the neutral state;

FIG. 16 is a sectional view of the third embodiment of the present invention in the forward low speed state;

FIG. 17 is a sectional view of the third embodiment of the present invention in the high speed state; and FIG. 18 is a sectional view of the third embodiment of the present invention in the reverse driving state.

Similar reference characters refer to similar parts throughout the several views of the drawings.

DETAILED DESCRIPTION OF THE INVENTION

Figure 1:
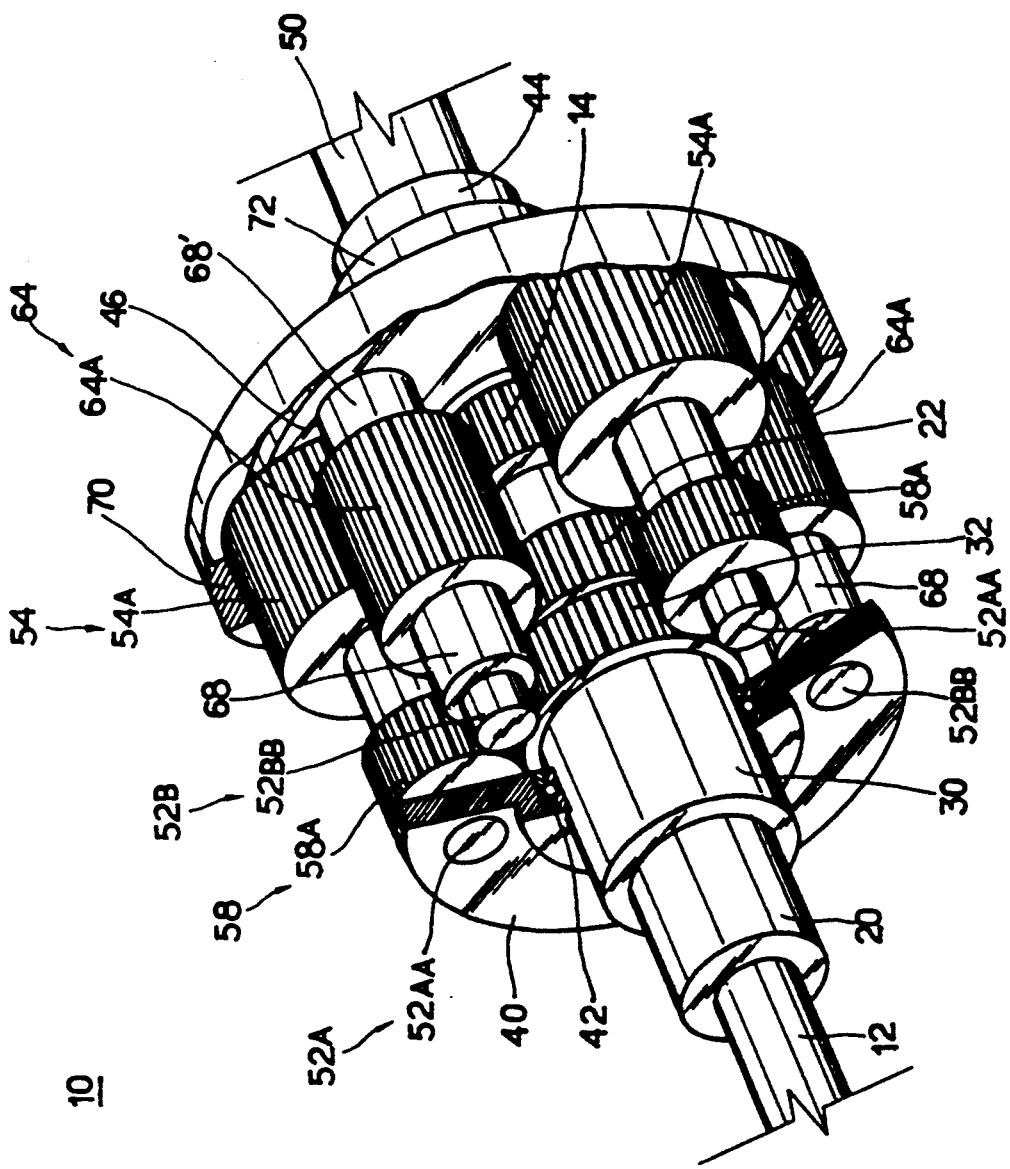
FIGS. 1–7 illustrate the first embodiment of the continuous automatic transmission according to the present invention.
Figure 2:
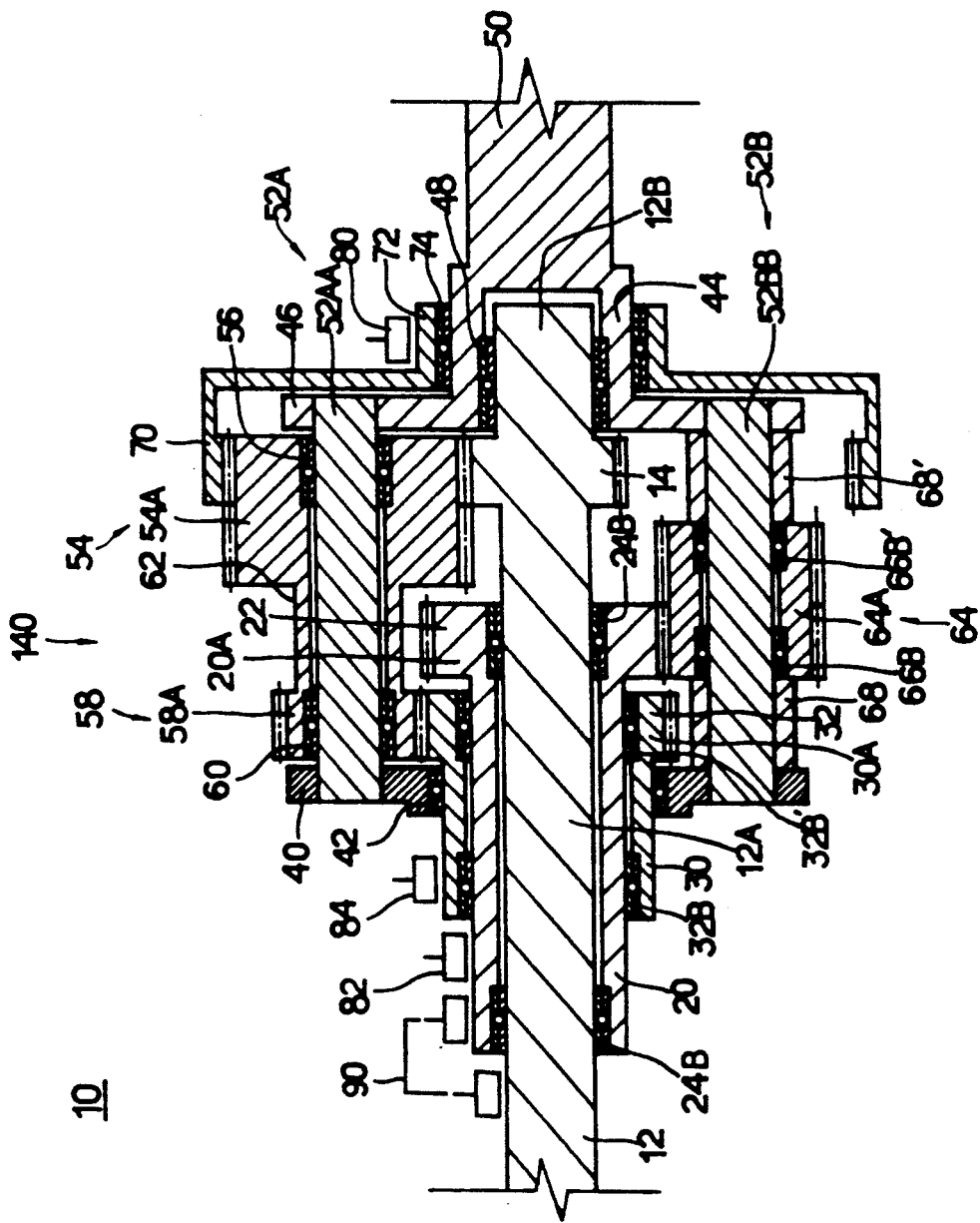

The continuous automatic transmission 10 of the first embodiment of the present invention, as shown in FIGS. 1 and 2, includes an input shaft 12 to which a driving force is input from the drive shaft of an engine. The input shaft 12 includes a first section 12A and a second section 12B with an input sun gear 14 integrally formed on the input shaft 12 between the first section 12A and the second section 12B. A medium speed control shaft 20 of predetermined length is coaxially installed on the first section 12A of the input shaft 12. A medium speed sun gear 22 is integrally formed at the end 20A of the medium speed control shaft 20. Bearings 24B, 24B' are installed to enable the input shaft 12 and the medium speed control shaft 20 rotate independently.

A reverse rotation control shaft 30 of predetermined length is coaxially installed on the medium speed control shaft 20. A reverse rotation sun gear 32 is integrally formed at the end 30A of the reverse rotation control shaft 30. Bearings, 32B, 32B' are installed to enable the medium speed control shaft 20 and the reverse rotation control shaft 30 to rotate independently.

The first carrier 40 is installed on the reverse rotation control shaft 30 near the reverse rotation sun gear 32 and rotates freely via a bearing 42. A second carrier 46 having a hollow cylindrical part 44 is installed on the second section 12B of the input shaft and rotates freely via a bearing 48. This carrier 46 is integrally formed with an output shaft 50.

A plurality of locking pins 52A, 52B interconnect and are secured to each of the first and second carriers 40, 46 so that the carriers 40, 46 rotate together about the input shaft 12, as see FIG. 1. The input differential gear 54A and the reverse rotation differential gear 58A are integrally formed together along a common axis and preferable with each gear being of a different size, i.e. circumference, and are spaced apart 62 from each other. The composite differential gears 54, 58 are rotatably mounted onto each locking pin 52AA so as to rotate freely via bearings 56, 60. Each input differential gear 54A and each reverse rotation differential gear 58A are installed near the second carrier 46 and near the first carrier 40 respectively, as see FIG. 2.

A gear 64A of the plurality of medium speed differential gears 64 is rotatably mounted onto each locking pin 52B so as to rotate freely via bearings 66B, 66B'. Bushings 68, 68' may be inserted to prevent the axial movement of the medium speed differential gear 64A along the locking pin 52B.

Three "first" sets are preferably used in the transmission of the present invention with a set consisting of a locking pin 52AA, an input differential gear 54A, a reverse rotation differential gear 58A and bearings 56, 60. In like manner, three "second" sets are used with each set consisting of a locking pin 52BB, a medium speed differential gear 64A, bearings 66B, 66B' and bushings 68, 68'. However, the number of such sets is not limited.

The inner side of the rear half of each input differential gear 54A meshes with the input sun gear 14, and the outer side of the rear half thereof meshes with the low speed ring gear 70. The low speed ring gear 70 includes a tube shaft boss 72, and a bearing 74 inserted between the tube shaft boss 72 and the hollow cylindrical part 44 to enable the low speed ring gear 70 to rotate independently about the hollow cylindrical part 44 of the second carrier 46. The forward half of each input differential gear 54A meshes with the rear half of each medium speed differential gear 64A. The inner side of the forward half of each medium speed differential gear 64A meshes with the medium speed sun gear 22. The inner side of each reverse rotation differential gear 58A meshes with the reverse rotation sun gear 32.

The brake means for applying a rotational braking force are used to effect an output shaft speed change. First, the low speed brake means 80 with a one way clutch is installed on the tube shaft boss 72 of the low speed ring gear 70 to apply the brake force to the low speed ring gear 70 to effect initiate of rotation of the output shaft and the low speed state. The medium speed brake means 82 with a one way clutch is installed on the medium speed control shaft 20 to adjust the medium speed sun gear 22 to effect the medium speed state. The reverse rotation brake means 84 is installed on the reverse rotation control shaft 30 to adjust the reverse rotation sun gear 32 in the reverse driving state.

Although the brake means as illustrated are installed on the tube shaft boss and/or the control shaft, the actual positions for of the brake means and the constructions thereof can be changed. Furthermore, the above described low speed, medium speed and reverse rotation brake means can use either automatic control or manual control, and electric, electronic, hydraulic or friction wheel brake means. As illustrated, the low speed ring gear 70 at the time of low speed, the medium speed control shaft 20 at the time of medium speed and the reverse rotation control shaft 30 at the time of reverse driving are braked by forcing a brake lining against their respective outer surfaces. This is a simple brake means, however, other brake means are well known in the art and would be expected to accomplish the braking purpose.

To remove any inconvenience in which, after applying the brake force, the brake force should again be required to be released when changing speed, a one way clutch is used in the low speed brake means 80 and the medium speed brake means 82. The one way clutch enables one way rotation.

Figure 6:
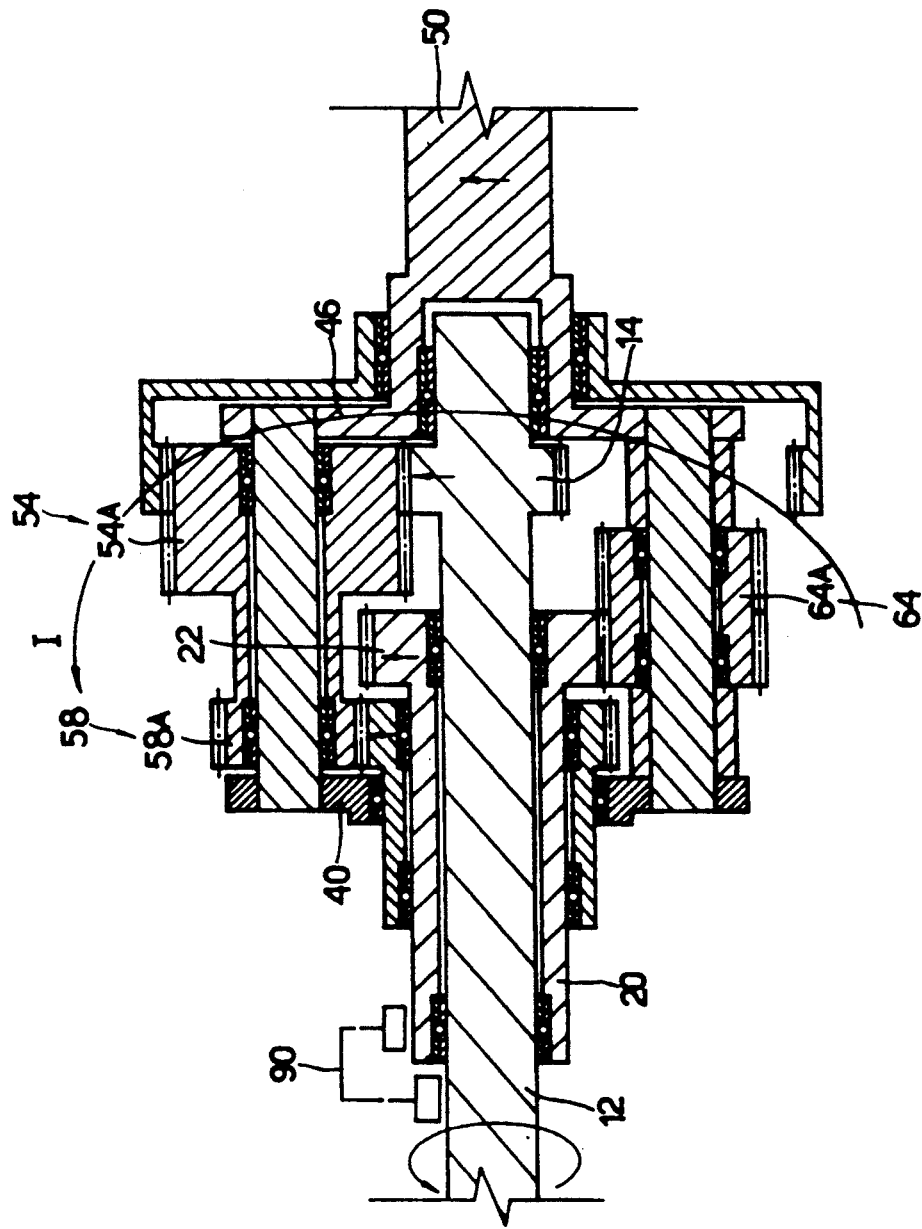
Figure 11:
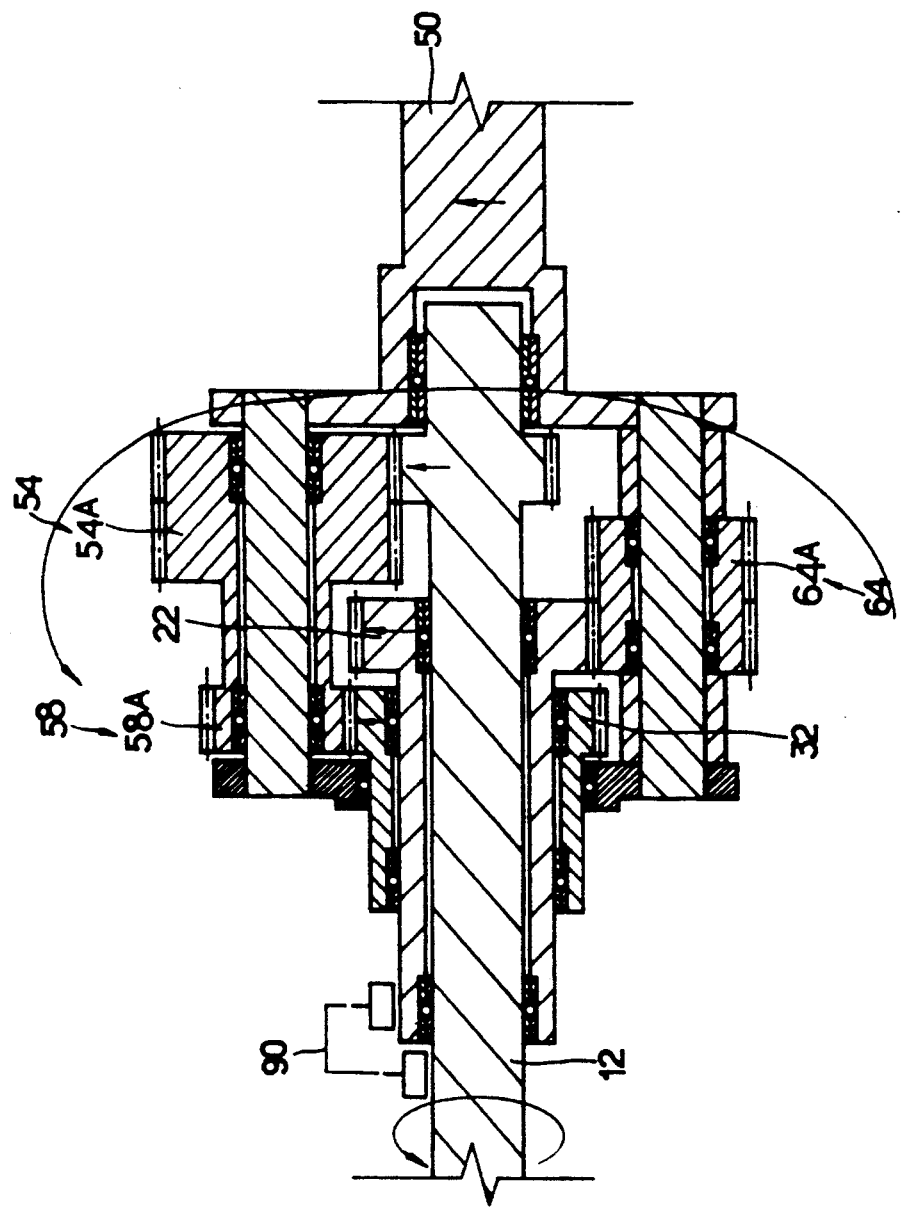
Figure 12:
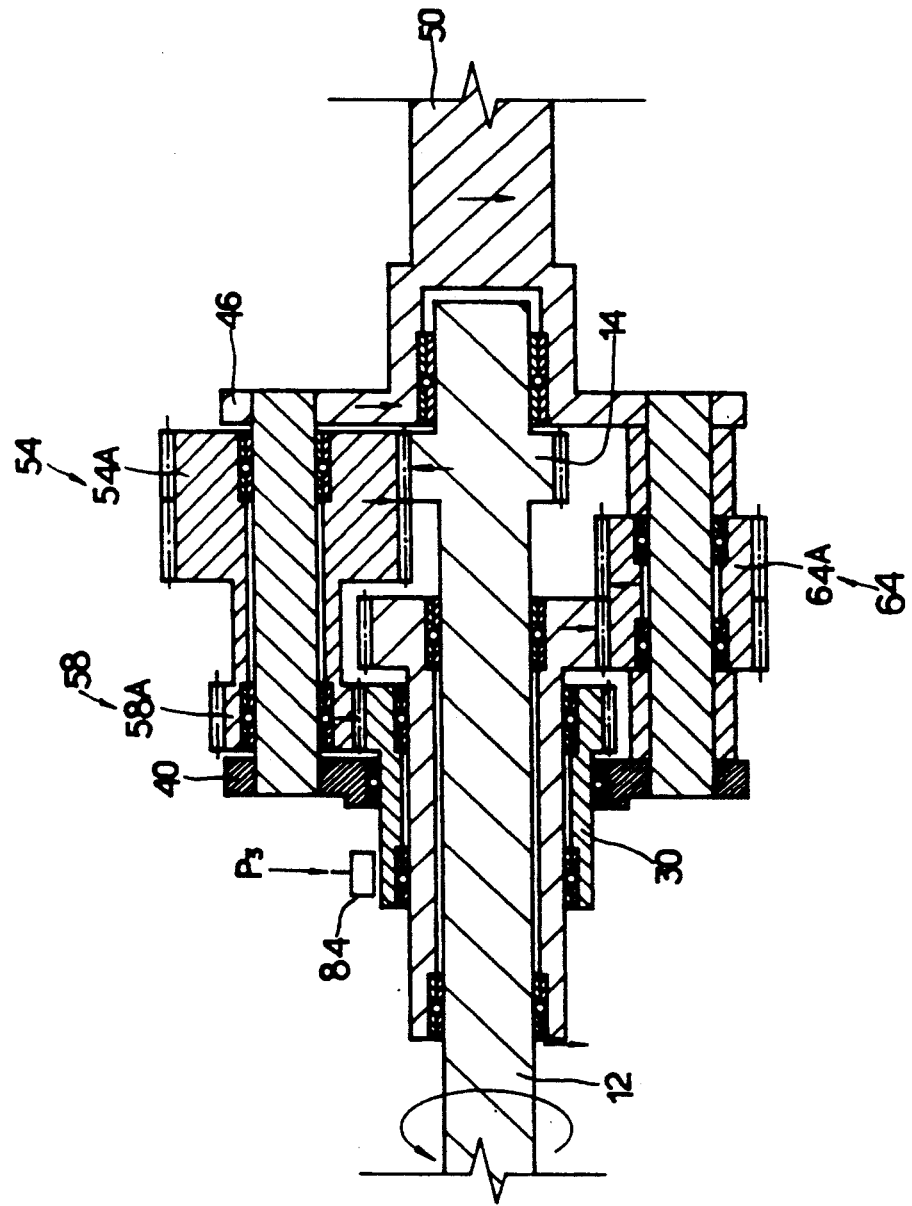

In the high speed state, see FIGS. 6 and 11, the input shaft 12 and the medium speed control shaft 20 are rotated integrally, by the interlocking means 90. While the interlocking means effects simultaneous rotation of the input shaft 12 and the medium speed control shaft 20, it can also effect a difference in their respective rotational speeds. That is, the interlocking means also enables the locking to progress slowly which will effect a difference between their respective rotational speeds. Such means 90 are known and include devices such as a hydraulic clutch, torque converter, electronic clutch, and the like. For the sake of brevity, a detailed description about such known devices is omitted.

The power transmission procedure and the principle of the speed variation of the continuous automatic transmission of the present invention will be briefly described below.

The continuous automatic transmission of the present invention can be used in any mechanism which utilizes rotational driving power such as an automobile and industrial machines. However, the following description is for an automobile.

In the figures the direction of rotation when viewed from the left side of each figure of the input shaft is counterclockwise, and such a direction is indicated as " ↑ ".

1. Neutral State (FIG. 3)

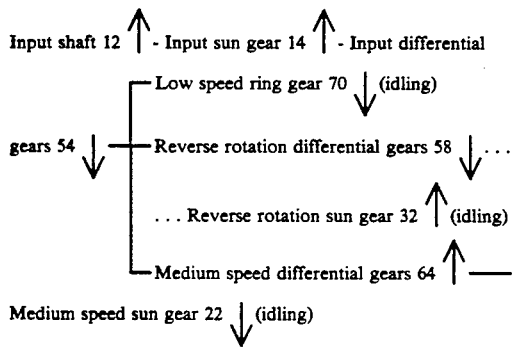

Figure 3:
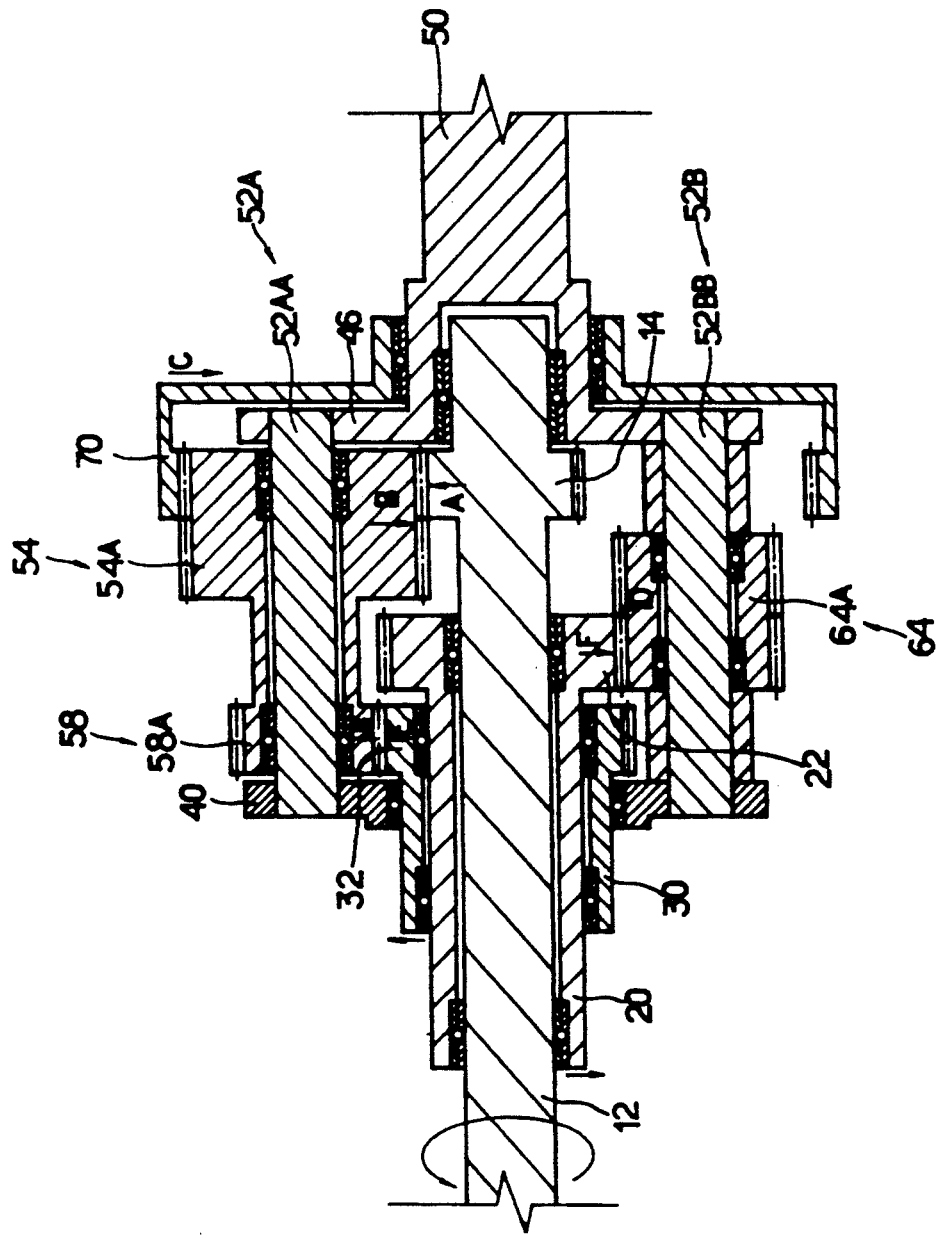

The neutral state is a state in which the driving force of the engine is not output to the output shaft 50 and the transmission idles as shown in FIG. 3. That is, if the rotational force from the driving shaft of the engine is input where a load is applied to the output shaft 50, then the input shaft 12 rotates and the input sun gear 14 integrally formed on the input shaft 12 rotates in a direction A. According to the rotation of the input sun gear 14, the input differential gears 54 and the reverse rotation differential gears 58 integrally formed with the input differential gears rotate about the locking pins 52A in a direction B opposite to the rotational direction of the input sun gear 14. The low speed ring gear 70, which is meshed with the input differential gear 54A, rotates in a direction C opposite to the rotational direction of the input sun gear 14 and the medium speed differential gear 64A, which is meshed with the input differential gear 54A, rotates about the locking pin 52BB in a direction D same as the direction of the input sun gear 14. The reverse rotation sun gear 32 meshed with the reverse rotation differential gear 58A which rotates in the direction B, rotates in a direction E same as the rotational direction of the input sun gear 14, and the medium speed sun gear 22 meshed with the medium speed differential gear 64A which rotates in the direction D rotates in a direction F which is opposite to the rotational direction of the input sun gear 14.

In the neutral state, owing to the second carrier 46 integrally formed with the output shaft 50 which is stationary due to the load, all the differential gears rotate only about their respective axis. The input driving force rotates the low speed ring gear 70 and the medium speed sun gear 22 in the direction C, F, respectively, which is opposite to that of the input sun gear, and rotates the reverse rotation sun gear 32 in the direction E which is the same as that of input shaft. Therefore, the driving force is not transmitted to the output shaft 50, that is, it is dissipated within the transmission.

Figure 4:
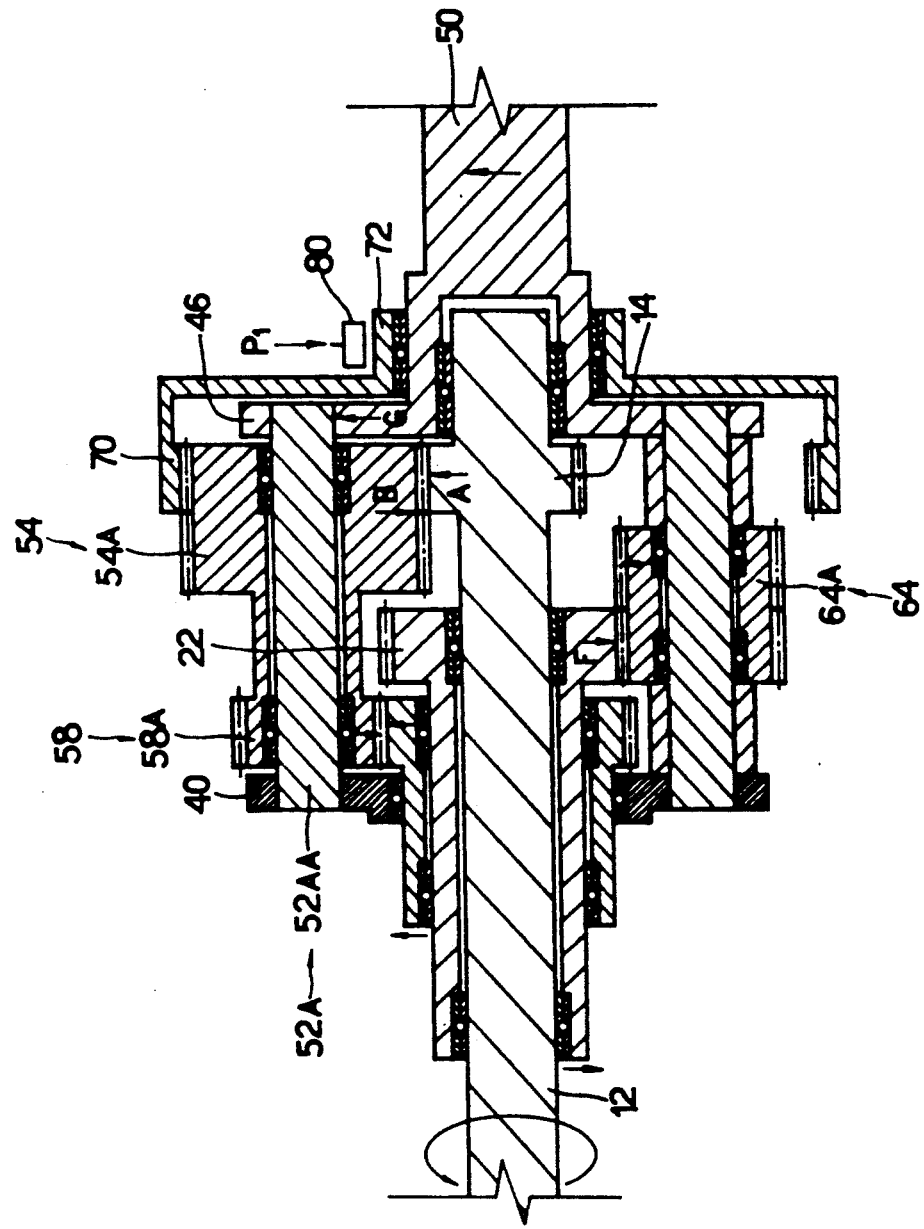

2. Low speed state (FIG. 4)

Input shaft 12 ↑ —input sun gear 14 ↑ —Input differential gears 54 ↓ —Carriers 40, 46 ↑ —Output shaft 50 ↑

The low speed state is a state in which the rotation of the output shaft 50 is initiated and gradually increased. In the above described neutral state, when the brake force P1 is applied by the low speed brake means 80 which is installed on the tube shaft boss 72 of the low speed ring gear 70, the rotational speed of the low speed ring gear 70, which was rotating in the direction C opposite to the rotation of the input shaft, decreases and eventually stops, causing an increase of the rotation of the output shaft 50 as the rotation of the low speed ring gear 70 decreases and stops. That is, when the rotation of the low speed ring gear 70 decreases and stops, the input differential gears 54 revolve around the inside of the low speed ring gear 70 while, at the same time, decreasing of rotation about their axis, while the carriers 40, 46 rotate in a direction G and the output shaft 50, integrally formed with the second carrier 46, rotates.

Reviewing the rotational direction of each gear during the low speed state, the input differential gears 54 rotate in the direction B opposite to the direction A of the input sun gear 14. The first and second carriers 40, 46 and the output shaft 50 rotate in the direction G, which is the same as that of the input sun gear 14. The input differential gears 54 rotate about their axis on the locking pins 52A in the direction B, and also revolve around the inside of the low speed ring gear 70 together with the first and second carriers 40, 46 in the direction G.

3. Medium speed state ( FIG. 5 )

Input shaft 12 ↑ —Input sun gear 14 ↑ —Input differential gears 54—Medium speed differential gears 64 ↑ — Carriers 40, 46 ↑ —Output shaft 50 ↑

The medium speed state increases the rotation of the output shaft 50 above the rotational speed of the low speed state. If a brake force P2 is applied by the medium speed brake means 82 installed on the medium speed control shaft 20, the rotational force of the medium speed sun gear 22, integrally formed on the medium speed control shaft 20 which was rotating in the direction F and which is opposite to that of the input shaft, decreases and stops. That is, as the rotation of the medium speed sun gear 22 decreases and stops, the rotation of the medium speed differential gears 64 about their axis decreases, and the medium speed differential gears 64 revolve around the medium speed sun gear 22 and increase the rotation (direction G) of the first and second carriers 40, 46. Consequently, the rotation of the output shaft 50, integrally formed on the second carrier 46, increases. At this time the rotational direction of the output shaft is the same as that of the input sun gear 14.

Reviewing the rotational direction of each gear, the low speed ring gear 70 meshed with the input differential gears 54 and the reverse rotation sun gear 32 meshed with the reverse rotation differential gears 58 rotate in the direction H, E, respectively, which is the same as that of the input sun gear 14. As the medium speed sun gear 22, which is meshed with the inside of the medium speed differential gears 64, comes to a stop, the rotational force of the carriers 40, 46 increases.

4. High speed state (FIG. 6)

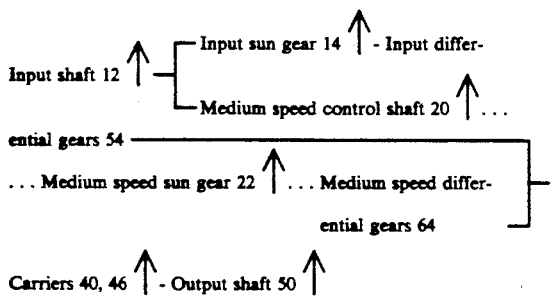

The high speed state further increases the rotational speed of the output shaft over the medium speed state. The input shaft 12 and the medium speed control shaft 20 rotate integrally by the interlocking means 90.

In the high speed state, the rotational force passed through the input shaft 12 is transmitted along two paths. In the first path, the rotational force is transmitted to the input sun gear 14 and the input differential gears 54 by passing through the input shaft 12 and rotating the input sun gear 14. In the second path, the rotational force is transmitted to the medium speed sun gear 22 and the medium speed differential gears 64 by rotating the medium speed control shaft 20 integrally with the input shaft 12 and at the same time rotating the medium speed sun gear 22.

The rotational forces, after passing along these two paths, are combined at the first and second carriers 40, 46 to rotate the output shaft 50. That is, since the rotational speed input to the input sun gear 14 and the medium speed sun gear 22 is the same in speed and direction, they cannot rotate the input differential gears 54 and the medium speed differential gears 64 on their axis, but rotate the first and second carriers 40, 46 and the output shaft 50 in the same direction as the input shaft 12.

In this state, all the gears and the first and second carriers 40, 46 constitute a single rotating body with the two sun gears 14, 22 as the centers to rotate in a direction I. At this time, the input, reverse rotation and medium speed differential gears rotate together with the first and second carriers 40, 46 and do not rotate about their own axis.

Figure 7:
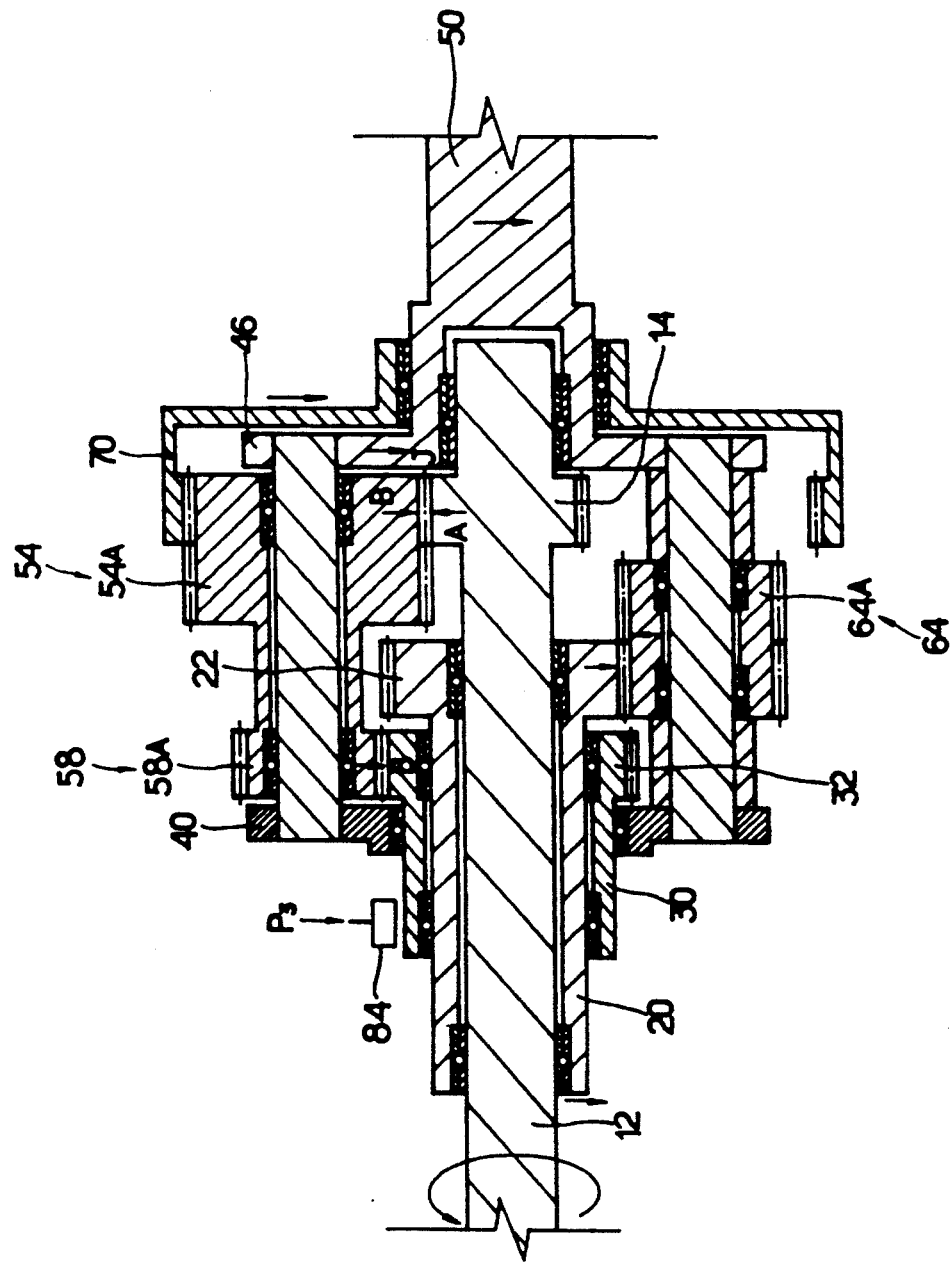

5. Reverse driving state (FIG. 7)

Input shaft 12 ↑ —Input sun gear 14 ↑ —Input differential gears 54 ↓ —Reverse rotation differential gears 58 ↓ —Carriers 40, 46 ↓ —Output shaft 50 ↓ (opposite to the direction of the input shaft)

The reverse driving state is a state in which the output shaft 50 rotates in a direction opposite to that of the input sun gear 14. If in the neutral state, a brake force P3 is applied by the reverse rotation brake means 84 installed on the reverse rotation control shaft 30, the reverse rotation sun gear 32 which was rotating in the direction E same as that of the input shaft 12 stops and the output shaft 50 rotates in a direction opposite to that of the input sun gear 14.

That is, as the rotation of the reverse rotation sun gear 32 decreases and stops, the reverse rotation differential gear 58A revolves around the reverse rotation sun gear 32 to rotate the carriers 40, 46 in a direction J, and the output shaft 50 integrally formed with the second carrier 46 rotates in a direction opposite to that of the input shaft 12.

Reviewing the direction of each gear in this state, the input differential gear 54A and the reverse rotation differential gear 58A rotate in the direction B opposite to the rotational direction A of the input sun gear 14, and the output shaft 50 integrally formed with the first and second carriers 40, 46 rotates in the direction J opposite to that of the input shaft. The input and medium speed differential gears rotate about their own axis and at the same time rotate together with the first and second carriers 40, 46. The low speed ring gear 70 meshed with the input differential gears 54 rotate in the direction opposite to that of the input shaft, the medium speed differential gears 64 meshed with the input differential gears rotate in same direction as that of the input shaft, and the medium speed sun gear 22 meshed with the medium speed differential gears rotate in the direction opposite to that of the input shaft.

Below is given a description of the second embodiment of the present invention in conjunction with FIGS. 8-12.

In the continuous automatic transmission 100 of the second embodiment of the present invention, the low speed ring gear 70, and the tube shaft boss 72, the bearing 74 and the low speed brake means 80 of the first embodiment are not required. However, the construction of the remaining parts is the same as described for the first embodiment.

Figure 8:
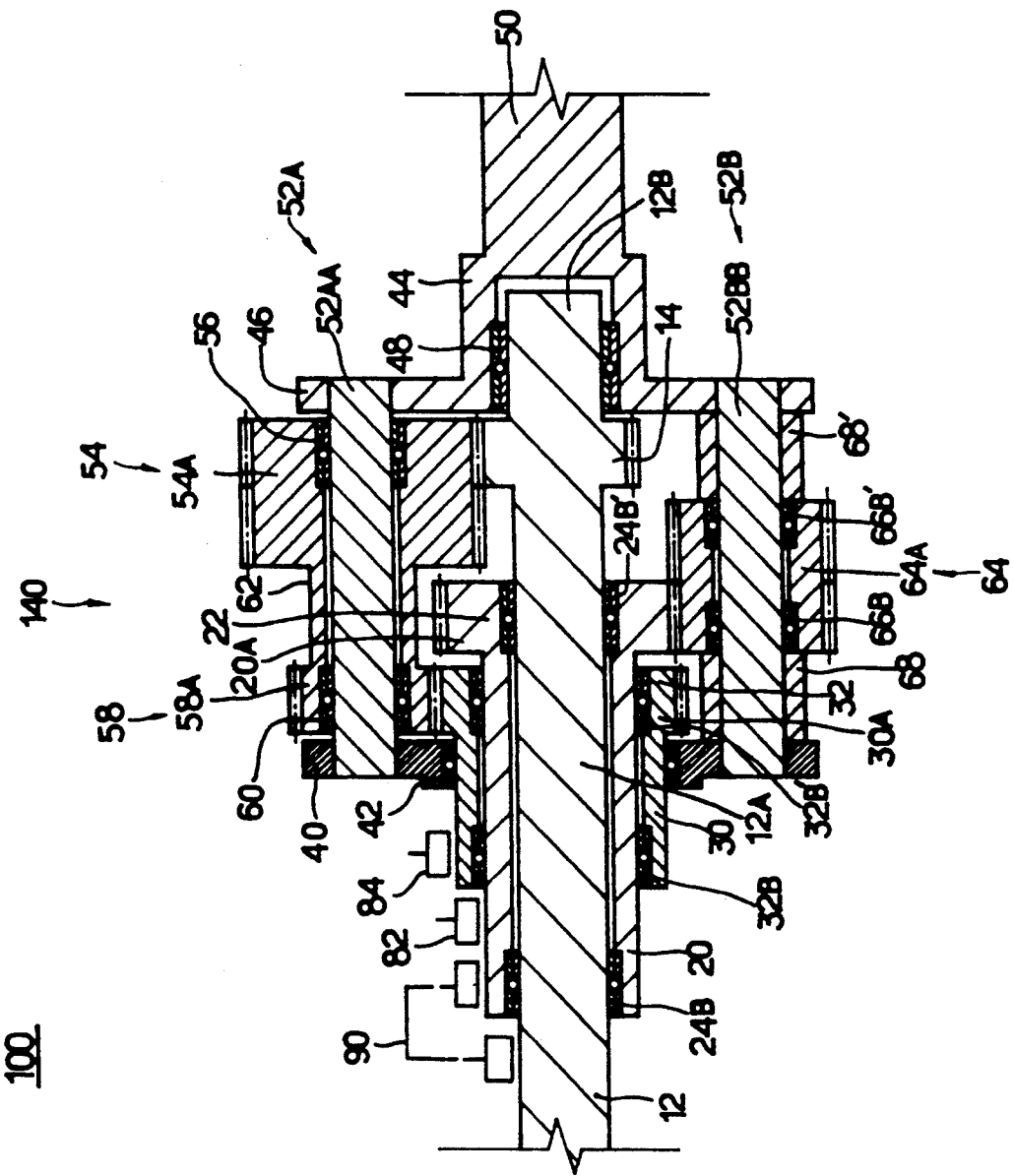
FIGS. 8–12 illustrate the second embodiment of the continuous automatic transmission of the present invention.

The second embodiment is described briefly with reference to FIG. 8. Those parts which are the same as those of the first embodiment are given the same reference numerals in this embodiment and a description about their respective construction and operation is omitted.

As in the first embodiment the brake means is used in applying the brake force to perform the speed change for each step.

The low speed ring gear 70 meshed with the outer side of the rear half of the input differential gears 54 idles in the neutral state of the first embodiment. However, because the low speed ring gear 70 is not used in the second embodiment, other operation state in the second embodiment is the same as that of the first embodiment except the operation relating to the low speed ring gear.

In this embodiment the medium speed brake means 82 is used to perform the medium speed driving as well as the low speed driving. That is, if a brake force is applied to the medium speed control shaft 20 by the medium speed brake means and the rotation of the medium speed control shaft decreases and stops, the rotation of the output shaft 50 is first initiated and then increases up to the medium speed. In the high speed state, the input shaft 12 and the medium speed control shaft 20 rotate integrally by using the interlocking means 90. The interlocking means 90 may gradually engage so as to enable a rotational difference between the input shaft 12 and the medium speed control shaft 20 and once fully engaged enables integral rotation. The interlocking means utilizes a system in which a hydraulic clutch, torque converter, electric electronic clutch, etc. is applied to or combined.

The power transmission procedure and the principle of the speed variation of the second embodiment of the continuous automatic transmission of the present invention constructed as such are similar to that of the first embodiment and will be briefly described below.

1. Neutral state (FIG. 9)

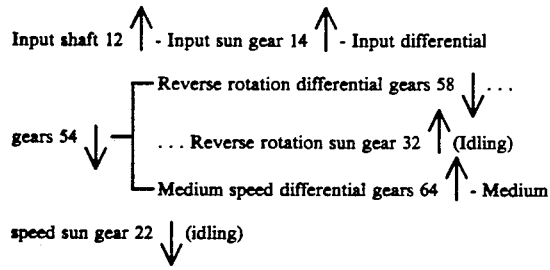

speed sun gear 22 ↓ (idling)

Figure 9:
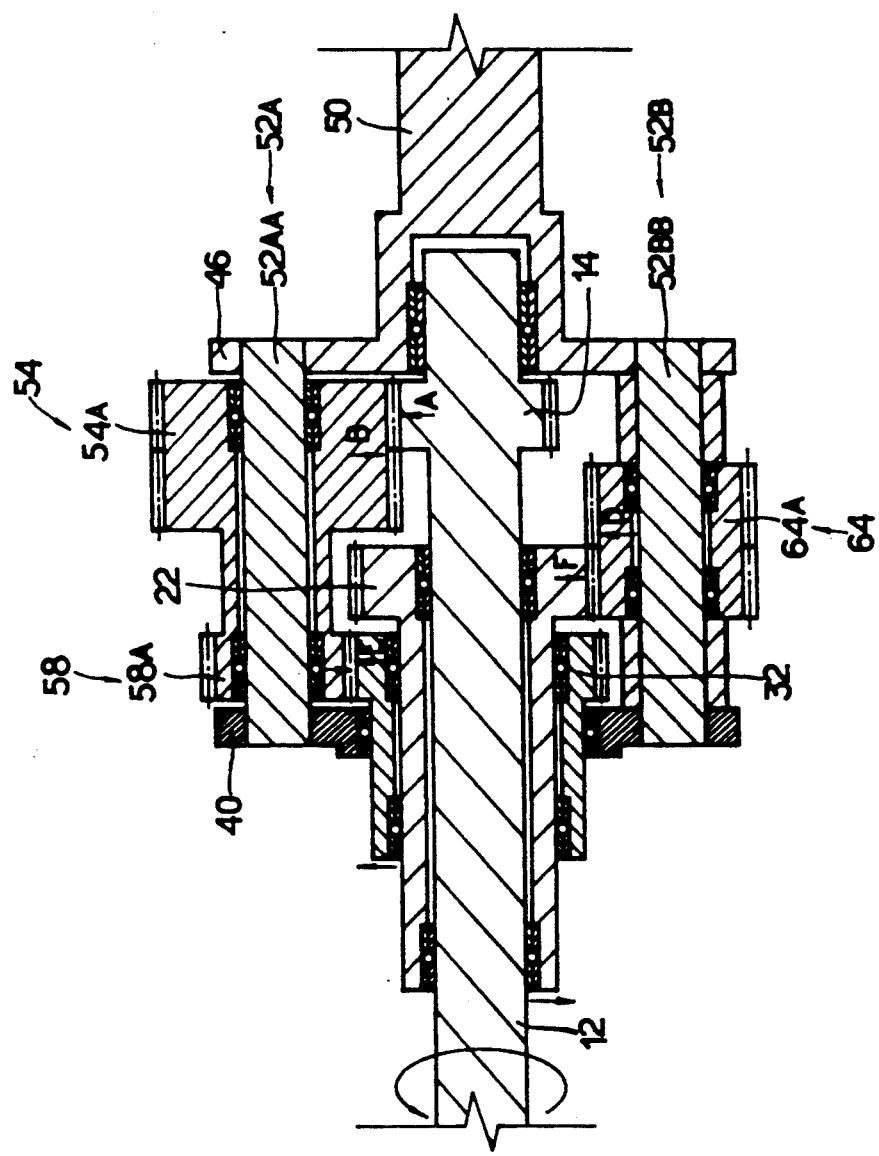
Figure 10:
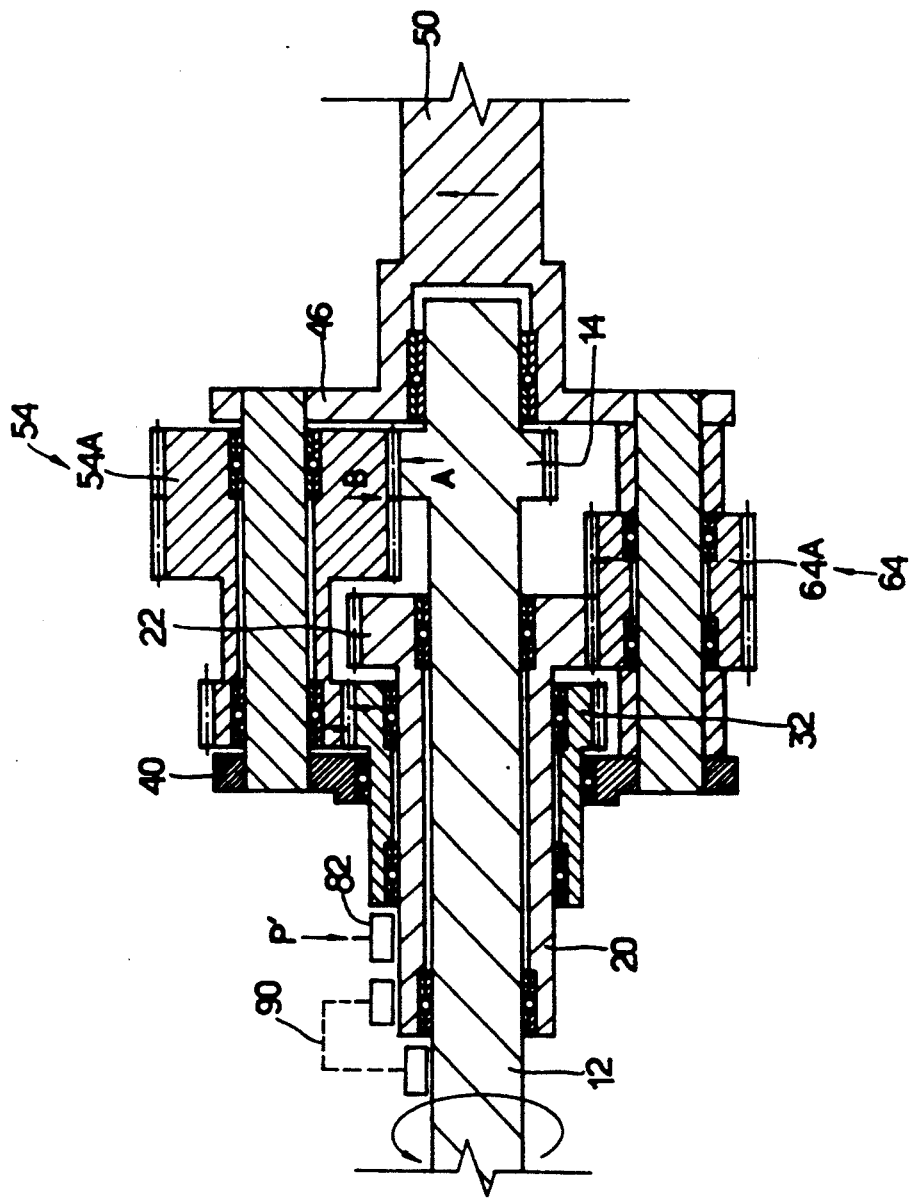

The neutral state is a state in which the driving force of the engine is not output to the output shaft 50 and the transmission idles as shown in FIG. 9. All the operation and construction are same as those of the first embodiment, except that the low speed ring gear 70 idles in the neutral state of the first embodiment.

That is, if the rotational force from the driving shaft of the engine is input, then the input shaft 12 and the input sun gear 14 rotate in a direction A, and the input differential gears 54 meshed with the input sun gear 14 and the reverse rotation differential gears 58, integrally formed with an input differential gear, rotate about the locking pin 52AA in a direction B opposite to the rotational direction of the input shaft. The medium speed differential gears 64, which mesh with the input differential gears 54, rotate about the locking pin 52BB in a direction D same as the direction of the input shaft. The reverse rotation sun gear 32 meshed with the reverse rotation differential gears 58 which rotate in the direction B, rotates in a direction E the same as the rotational direction of the input sun gear 14, and the medium speed sun gear 22 meshed with the medium speed differential gears 64 which rotate in the direction D rotates in a direction F which is opposite to the rotational direction of the input sun gear 14.

In this neutral state, owing to the second carrier 46 which is stationary due to the load on the output shaft, all the differential gears only rotate about their own axis. The input driving force rotates the medium speed sun gear 22 in the direction F which is opposite to that of the input sun gear 14, and rotates the reverse rotation sun gear 32 in the direction E which is the same as that of input shaft. Therefore, the driving force is not transmitted to the output shaft 50, that is, it is dissipated within the transmission.

2. Forward (low and medium speed) state (FIG. 10)
Input shaft 12 ↑ —Input sun gear 14 ↑ —Input differential gears 54 ↓ —Medium speed differential gears 64 ↑ —Carriers 40, 46 ↑ —Output shaft 50 ↑

Figure 5:
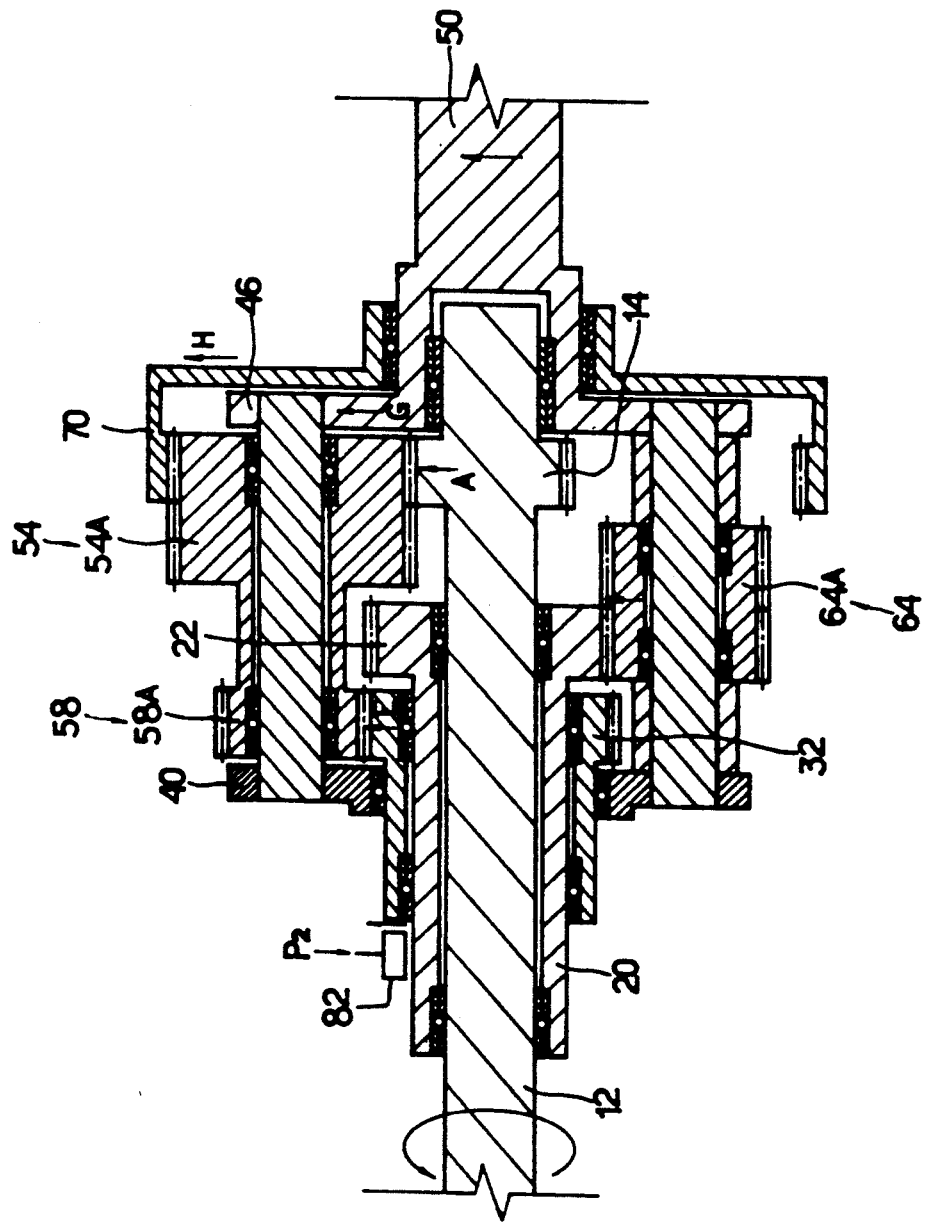

Because this state is similar to the medium speed state of FIG. 5 of the first embodiment, the description thereof will be brief. If a brake force P' is applied by the medium speed brake means 82 installed on the medium speed control shaft 20, the rotational speed of the medium speed sun gear 22, which was rotating in the direction F opposite to that of the input shaft 12 in the natural state, deceases and stops. In this state, the rotation of the output shaft 50 is initiated and increases gradually up to the medium speed in proportion to the decreasing of rotation of the medium speed sun gear 22.

3. High speed state (FIG. 11)

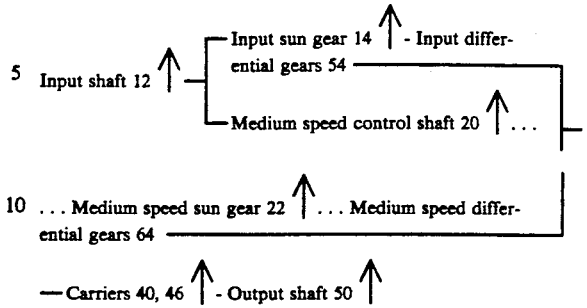

— Carriers 40, 46 ↑ - Output shaft 50 ↑

Because this state is similar to the high speed state of FIG. 6 in the first embodiment, a description about this is omitted.

4. Reverse driving state (FIG. 12)
Input shaft 12 ↑ —Input sun gear 14 ↑ —Input differential gears 54 ↓ —Reverse rotation differential gears 58 ↓ — Carriers 40, 46 ↓ —Output shaft 50 ↓ (Opposite to the direction of the input shaft)

Because this state is similar to the reverse driving state of FIG. 7 in the first embodiment, a description about this is omitted.

Below is given a description about the third embodiment of the present invention in conjunction with FIGS. 13–18.

In the continuous automatic transmission 300 of the third embodiment of the present invention, the medium speed control shaft 20, the medium speed sun gear 22, the medium speed brake means 82, the medium speed differential gears 64 meshed with the medium speed sun gear and the locking pins 52B of the first embodiment are not required.

Figure 13:
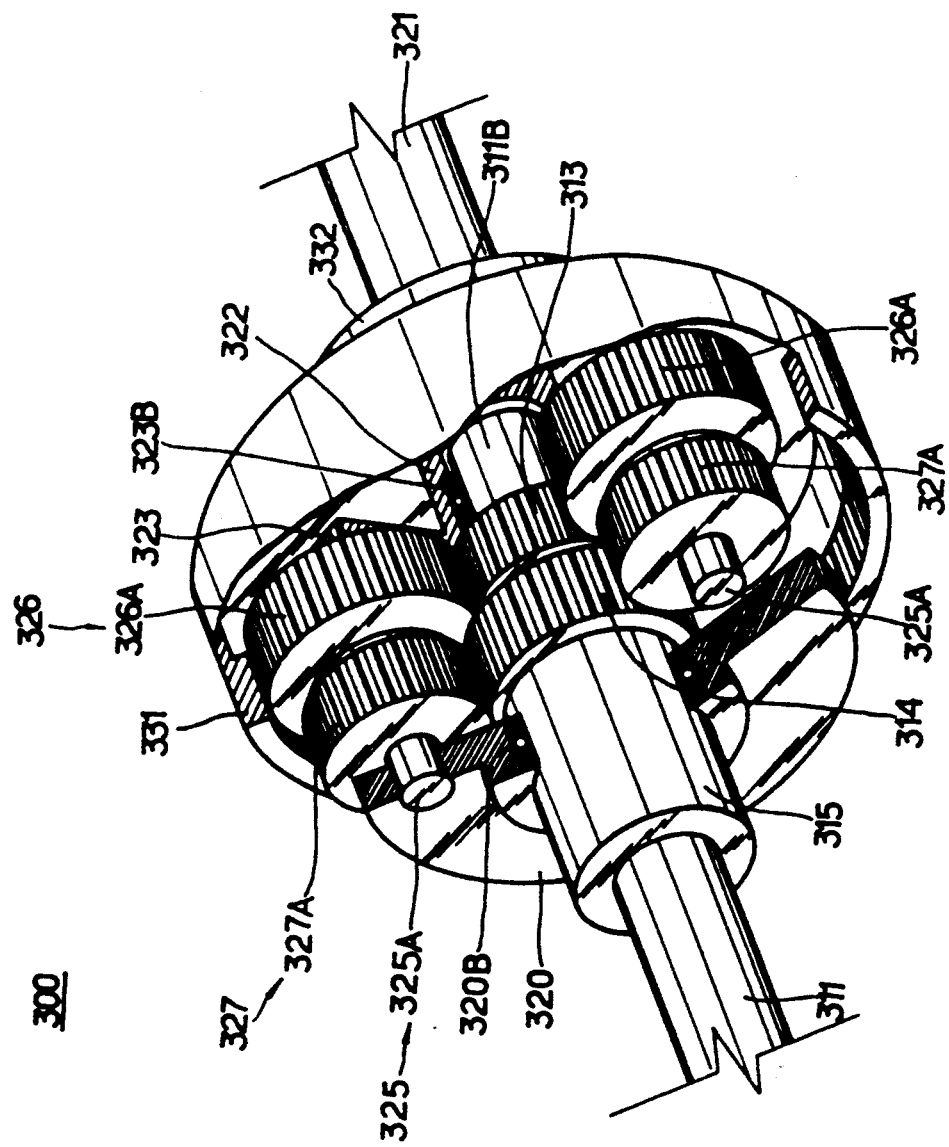
Figure 14:
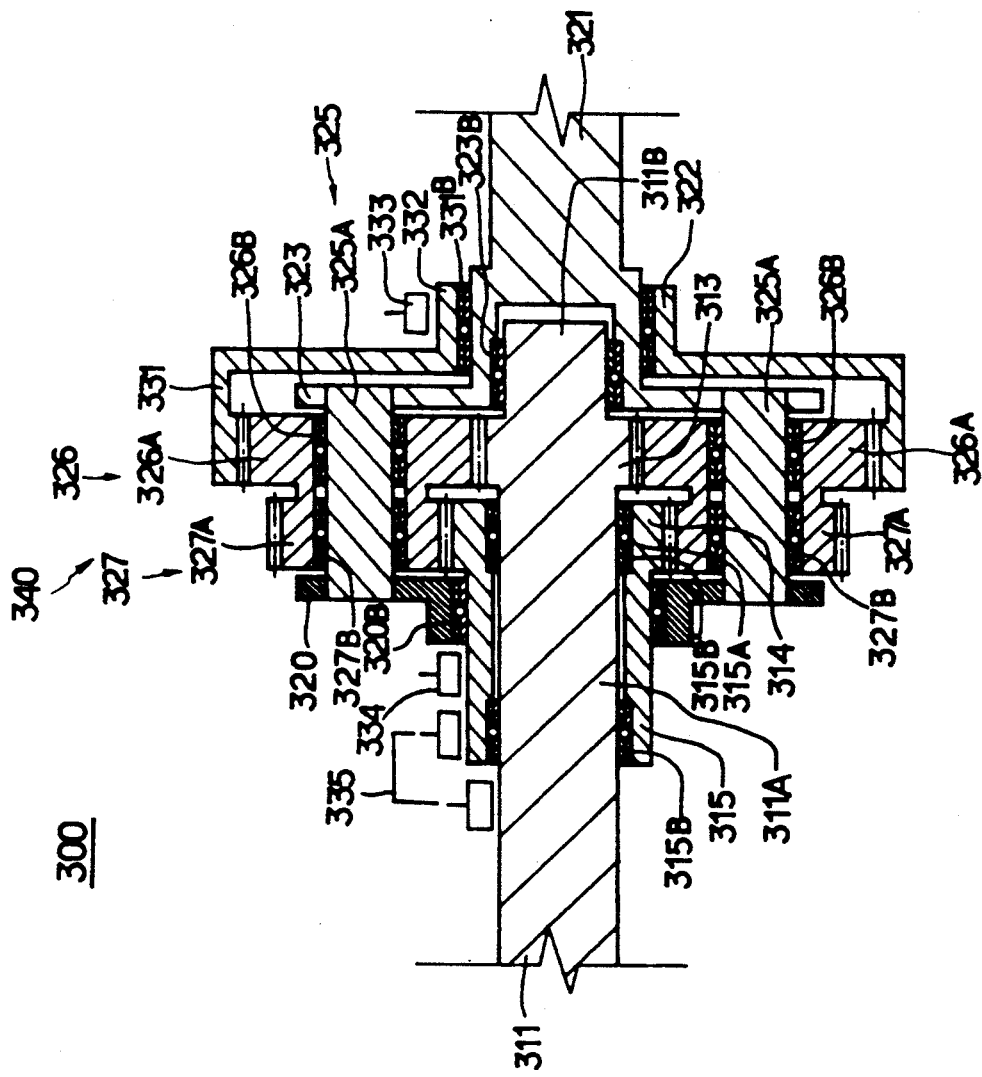

The continuous automatic transmission 300 of the third embodiment of the present invention, as shown in FIGS. 13 and 14, includes an input shaft 311 to which a driving force is input from the drive shaft of an engine. The input shaft 311 consists of a first section 311A and a second section 311B. An input sun gear 313 is integrally formed with the input shaft 311 between the first section 311A and the second section 311B.

A reverse rotation control shaft 315 of predetermined length is coaxially installed on the first section 311A of the input shaft 311. A reverse rotation sun gear 314 is integrally formed at the end 315A of the reverse rotation control shaft 315. Bearings 315B, 315B' are installed to enable the reverse rotation control shaft 315 and the input shaft 311 to rotate freely.

The first carrier 320 is installed on the reverse rotation control shaft 315 near the reverse rotation sun gear 314 and rotates freely via a bearing 320B. A second carrier 323 having a hollow cylindrical part 322 is installed on the second section 311B of the input shaft and rotates freely thereon via a bearing 323B. The second carrier 323 is integrally formed with the output shaft 321.

A plurality of locking pins 325 interconnect and secured each of the first and second carriers 320, 323 together to enable the carriers 320, 323 to rotate together about the input shaft 311 (See FIG. 13). Composite planetary gears consist of an input planetary gear 326A and a reverse rotation planetary gear 327A which are integrally formed and which have a different size. The composite planetary gears are rotatably mounted onto each locking pin 325A so as to rotate freely via bearings 326B, 327B. Each input planetary gear 326A and each reverse rotation planetary gear 327A are installed near the second carrier 323 and the first carrier 320, respectively.

The input planetary gear 326A and the reverse rotation planetary gear 327A can be installed by other methods. That is, the two planetary gears can be integrally formed with the locking pin and a bearing can be inserted at each end of the locking pin so that the locking pin can rotate about its axis.

Three "first" sets are preferably used in the transmission of the present invention with a set consisting of a locking pin 325A, an input planetary gear 326A, a reverse rotation planetary gear 327A and bearings 326B, 327B, but the number of such sets is not limited. Preferably 2 or more are used.

The inner side of each input planetary gear 326A meshes with the input sun gear 313, and the outer side thereof meshes with a low speed ring gear 331. The low speed ring gear 331 includes a tube shaft boss 332, and a bearing 331B is inserted between the tube shaft boss 332 and the hollow cylindrical part 322 such that the low speed ring gear 331 rotates independently about the hollow cylindrical part 322. The inner side of each reverse rotation planetary gear 327A meshes with the reverse rotation sun gear 314.

The brake means for applying a rotational braking force are used to perform an output shaft speed change for each step. First, a low speed brake means 333 is installed on the tube shaft boss 332 of the low speed ring gear 331 to apply the brake force to the low speed ring gear 331 to initiate rotation of the output shaft and the forward low speed state. A reverse rotation brake means 334 is installed on the reverse rotation control shaft 315 to adjust the reverse rotation sun gear 314 to effect a reverse driving state.

In order to further increase the rotation of the output shaft over the forward low speed state, the interlocking means 335 is used which enables rotational difference between the input shaft 311 and the reverse rotation control shaft 315 or which can rotate them integrally. In the high speed state, the input shaft 311 and the reverse rotation control shaft 315 rotate integrally by the interlocking means 335.

The power transmission procedure and the principle of the speed variation of the third embodiment of the continuous automatic transmission of the present invention constructed as such are similar to that of the first embodiment and will be briefly described below.

1. Neutral State (FIG. 15)

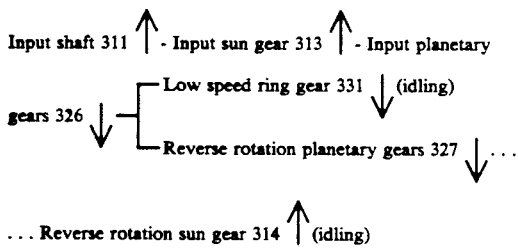

Figure 15:
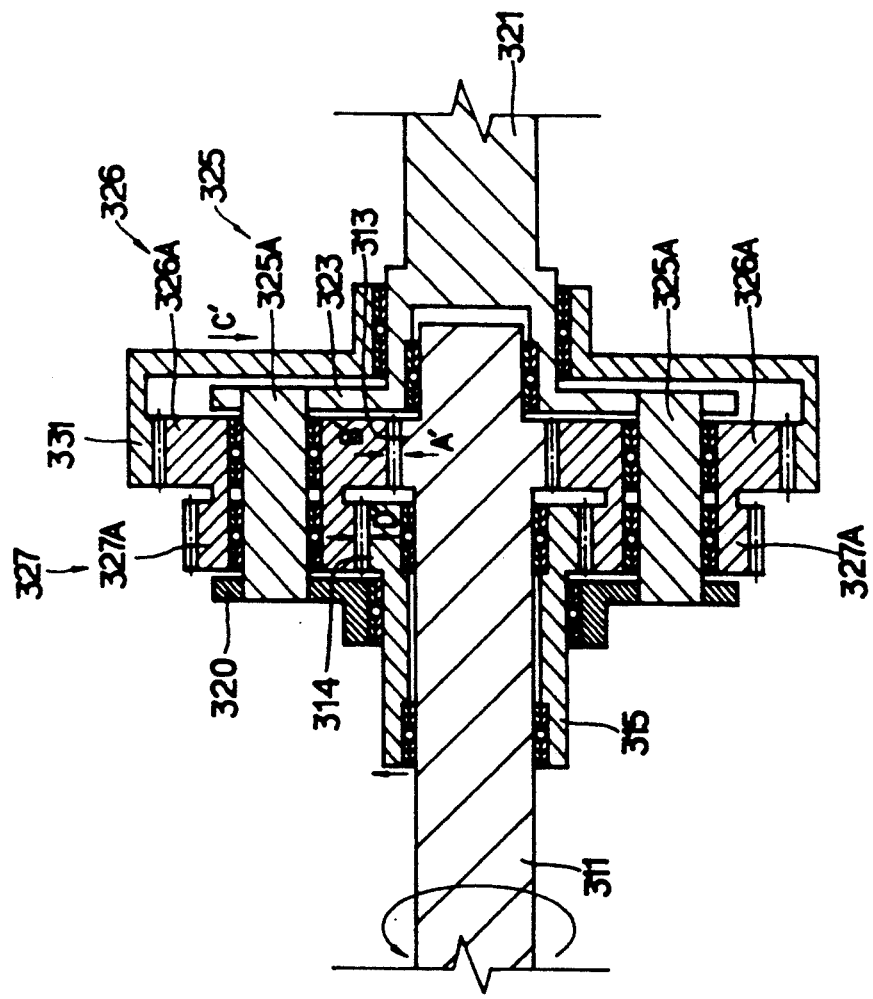

The neutral state is a state in which the driving force of the engine is not output to the output shaft 50 and the transmission idles as shown in FIG. 15. All the operation and construction are same as those of the first embodiment, except that the medium speed differential gears 64 and the medium speed control shaft 22 operate.

That is, if the rotational force from the driving shaft of the engine is input where the load is applied to the output shaft 321, then the input shaft 311 and the input sun gear 313 rotate in a direction A', and the input planetary gears 326 meshed with the input sun gear 313 and each of the reverse rotation planetary gears 327, integrally formed with an input planetary gears, rotate about the locking pin 325A in a direction B' opposite to the rotational direction of the input sun gear 313. That is, owing to the second carrier 323 integrally formed with the output shaft 321 on which the load is applied, the input and the reverse rotation planetary gears 326, 327 only rotate about their respective locking pin 325A. The low speed ring gear 331 meshed with the input planetary gears 326 rotates in a direction C', which is opposite to that of the input sun gear 313. The reverse rotation sun gear 314 meshed with the reverse rotation planetary gears 327 and the reverse rotation control shaft 315 integrally formed with the reverse rotation sun gear 314 rotate in a direction D'.

Thus, the driving force input through the input shaft 311 is not transmitted to the output shaft 321 but is dissipated by idling in the direction C', D'.

Figure 16:
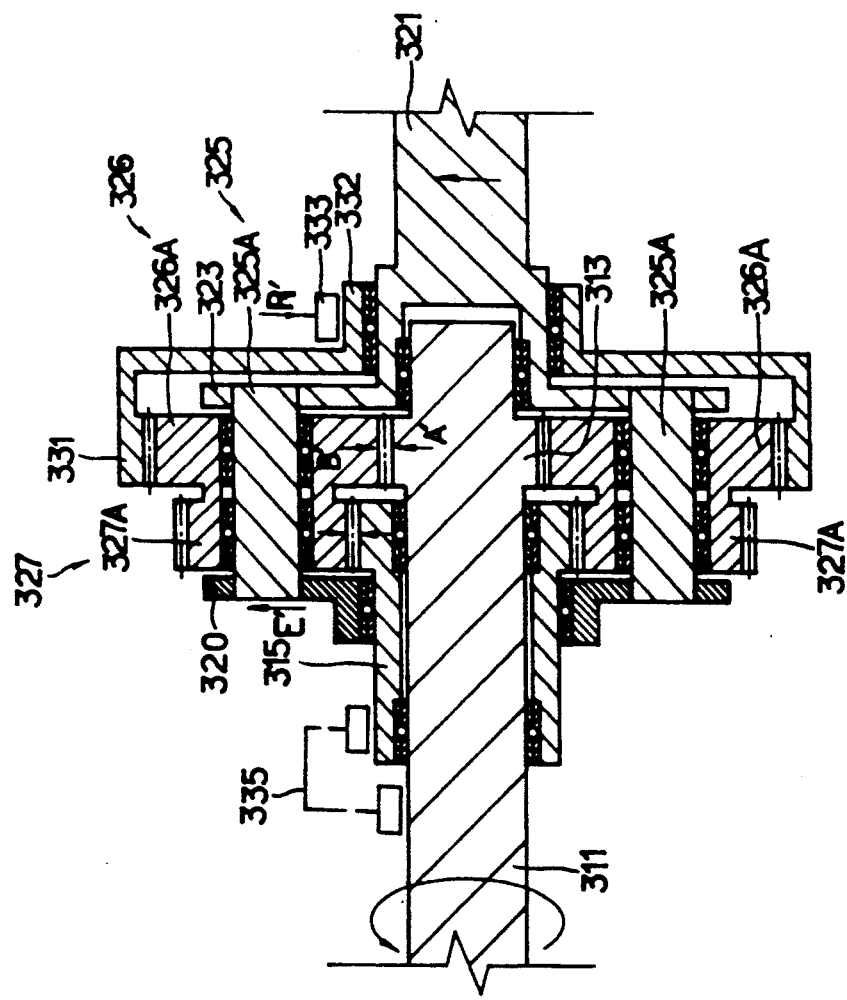

2. Forward low speed state (FIG. 16)

Input shaft 311 ↑ —input sun gear 313 ↑ —Input planetary gears 326 ↓ —Carriers 320, 323 ↑ —Output shaft 321 ↑

This state is similar to the low speed state of FIG. 4 in the first embodiment. In the above described neutral state, when the brake force P1' is applied by the low speed brake means 333, which is installed on the tube shaft boss 332 of the low speed ring gear 331, the rotational speed of the low speed ring gear 331, which was rotating in the direction C' opposite to the rotation of the input shaft, decreases and eventually stops, causing the initiation and the increase of the rotation of the output shaft 321 as the rotation of the low speed ring gear 331 decreases and stops. That is, the driving force passed through the input shaft 311 and the input sun gear 313 rotates the input planetary gears 326 in the direction B', then the input planetary gears 326 revolve around the inside of the low speed ring gear 331 of which rotation decreases and stops due to the brake force P1' while, at the same time, rotating about their axis, the carriers 320, 323 rotate in a direction E' and the output shaft 321 integrally formed with the second carrier 323, rotates.

Reviewing the rotational direction of each gear during the forward low speed state, the input planetary gears 326 rotate in the direction B' opposite to the direction A' of the input sun gear 313. The first and second carriers 320, 323 and the output shaft 321 rotate in the direction E', which is the same as that of the input sun gear 313. The input planetary gears 326 rotate about their axis on the locking pins 325 in the direction B', and also revolve around the inside of the low speed ring gear 331 together with the first and second carriers 320, 323 in the direction E'.

In order to further increase the rotation of the output shaft, the interlocking means 335 is used. The rotation of the output shaft 321 increases in proportion to the rotational speed of the reverse rotation control shaft 315 which rotates in the direction of the input shaft 311.

Figure 17:
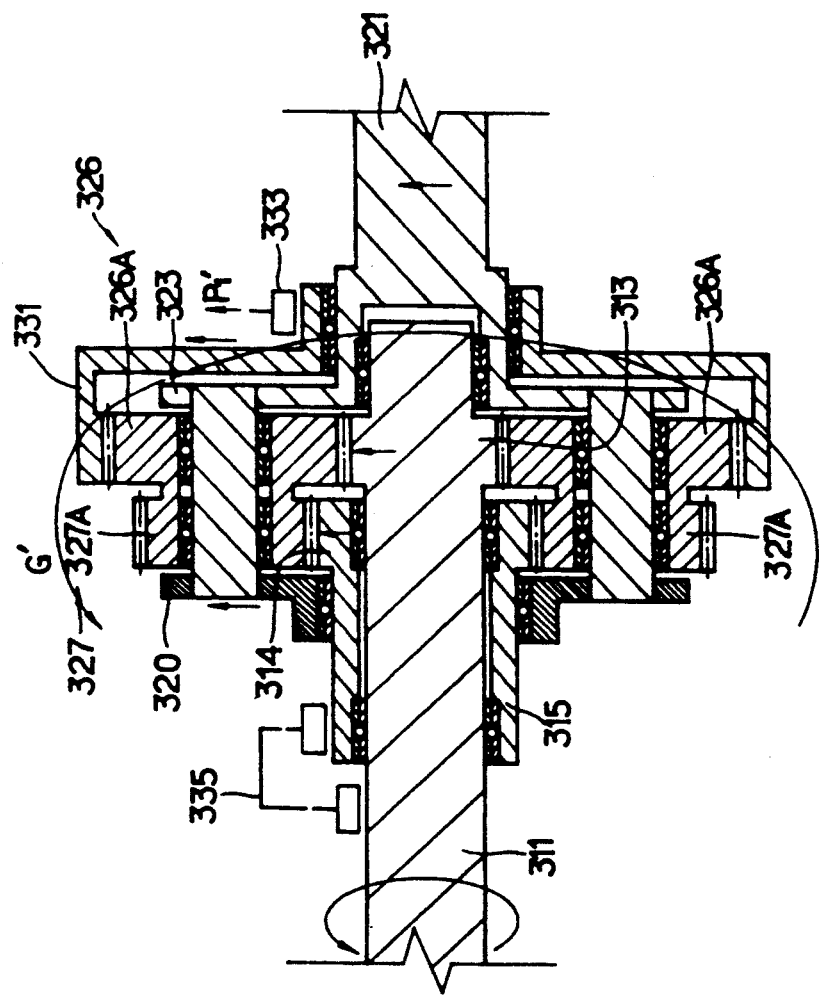

3. High speed state (FIG. 17)

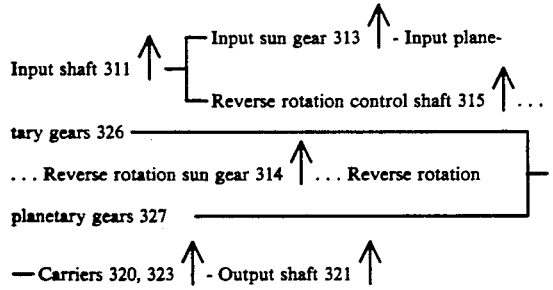

This state is similar to the high speed state of FIG. 6 of the first embodiment. In a state in which the brake force P1' applied to the low speed ring gear 331 is released, and the interlocking means 335 engaged, the input shaft 311 and the reverse rotation control shaft 315 rotate integrally.

In the high speed state, the rotational force passes through the input shaft 311 is transmitted along two paths. In the first path, the rotational force is transmitted to the input planetary gears 326 by passing through the input shaft 311 and rotating the input sun gear 313.

In the second path, the rotational force is transmitted to the reverse rotation planetary gears 327 by rotating the reverse rotation control shaft 315 integrally with the input shaft 311 and at the same time rotating the reverse rotation sun gear 314.

The rotational forces, after passing along these two paths, are combined at the first and second carriers 320, 323 to rotate the output shaft 321. That is, since the rotational speed input to the input sun gear 313 and the reverse rotation sun gear 314 is the same in both speed and direction, they cannot rotate the input planetary gears 326 and the reverse rotation planetary gears 327 on their axis, but rotate the first and second carriers 320, 323 and the output shaft 321 in the same direction as the input shaft 311. In this state, all the gears and the first and second carriers 320, 323 constitute a single rotating body with the two sun gears 313, 314 as the centers to rotate in a direction G'.

4. Reverse driving state (FIG. 18)

Input shaft 311 ↑ —Input sun gear 313 ↑ —Input planetary gears 326 ↓ —Reverse rotation planetary gears 327 ↓ —Carriers 320, 323 ↓ —Output shaft 321 ↓ (opposite to the direction of the input shaft)

This state is similar to the reverse driving state of FIG. 7 of the first embodiment. If in the neutral state, a brake force P2' is applied by the reverse rotation brake means 334 installed on the reverse rotation control shaft 315, the reverse rotation control shaft 315 and the reverse rotation sun gear 314 stop and the output shaft 321 rotates in a direction opposite to that of the input sun gear 313.

That is, the rotational force passed through the input shaft 311 and input sun gear 313 rotates the input planetary gears 326 and the reverse rotation planetary gears 327 in the direction B'. The reverse rotation planetary gears 327 rotate on their own axis and at the same time revolve around the reverse rotation sun gear 314 of which rotation decreases and stops due to the brake force P2' to rotate the carriers 320, 323 in a direction H' and the output shaft 321, integrally formed with the second carrier 323, rotates in a direction opposite to that of the input shaft 311. The low speed ring gear 331, meshed with the input planetary gears 326, rotates in same direction as that of the output shaft 321.

On the one hand, a required output in revolutions, output relative to input, can be obtained by properly adjusting the number of teeth on each gear according to a desired purpose.

Table 1 presents the number of teeth of each gear in the first embodiment as an example, and Table 2 presents the revolutions of the output shaft (per 1 revolution of the input shaft) according to Table 1. In like manner, Table 3 presents the number of teeth of each gear in the second embodiment, and Table 4 presents the revolutions of the output shaft (per 1 revolution of the input shaft) according to Table 3. Table 5 and Table 6 present the number of teeth of each gear in the third embodiment and the revolutions of the output shaft according to Table 5, respectively.

TABLE 1

(First embodiment)

| | Input sun gear (14) | Input differential gear (54) | Reverse rotation differential gear (58) | Medium speed differential gear (64) | Low speed ring gear (70) | Medium speed sun gear (22) | Reverse rotation sun gear (32) |
|---|---|---|---|---|---|---|---|
| 1 | 23 | 40 | 18 | 37 | 103 | 26 | 45 |
| 2 | 24 | 36 | 18 | 30 | 96 | 30 | 42 |
| 3 | 24 | 33 | 18 | 30 | 90 | 27 | 39 |

TABLE 2

| | Low speed ring gear (70) stops | Medium speed control shaft (20) stops | Reverse rotation control shaft (30) stops |
|---|---|---|---|
| 1 | 0.1825 | 0.4694 | −0.2987 |
| 2 | 0.2 | 0.4444 | −0.4 |
| 3 | 0.2105 | 0.4705 | −0.505 |

TABLE 3

(Second embodiment)

| | Input sun gear (14) | Input differential gear (54) | Reverse rotation differential gear (58) | Medium speed differential gear (64) | Medium speed sun gear (22) | Reverse rotation sun gear (32) |
|---|---|---|---|---|---|---|
| 1 | 21 | 33 | 18 | 22 | 32 | 36 |
| 2 | 24 | 38 | 18 | 22 | 40 | 44 |
| 3 | 24 | 36 | 18 | 18 | 42 | 42 |

TABLE 4

| | Medium speed sun gear (22) stops (forward driving) | Reverse rotation sun gear (32) stops (reverse driving) |
|---|---|---|
| 1 | 0.3962 | −0.3414 |
| 2 | 0.375 | −0.3483 |
| 3 | 0.3636 | −0.4 |

TABLE 5

(Third embodiment)

| | Input sun gear (313) | Input planetary gear (326) | Reverse rotation planetary gear (327) | Reverse rotation sun gear (314) | Low speed ring gear (331) |
|---|---|---|---|---|---|
| 1 | 21 | 36 | 18 | 42 | 96 |
| 2 | 21 | 33 | 18 | 45 | 87 |
| 3 | 24 | 38 | 18 | 44 | 100 |

TABLE 6

| | Low speed ring gear (331) stops (forward low speed driving) | Reverse rotation sun gear (314) stops (reverse driving) |
|---|---|---|
| 1 | 0.2 | −0.4 |
| 2 | 0.1944 | −0.341 |
| 3 | 0.193 | −0.348 |

As described above, the continuous automatic transmission has advantages in that there is no need to install a clutch to disengage the power of the engine when it is transmitted through the input shaft and output to the output shaft. Thus, satisfactory speed adjustment is possible through the adjustment of the speed variation ratio without a change or disengagement of the gears. Driving in a backward direction, i.e. reverse, is also possible and the operation procedure of the transmission of the present invention is very simple due to its simple structure.

The continuous automatic transmission of the present invention is not limited to the present embodiment, but can be applied to any device which transmits and outputs the driving force to an output shaft in all vehicles and industrial machines based on the principle of the present invention.

In addition, in the embodiment of the present invention, the simple lining braking method is used as the method to apply the brake force by the brake means, however, various alterations can be made to the construction, the embodying method and the position of such means, and various circuit constructions are possible for automatic control such as hydraulic, pneumatic, electric and electronic control devices without departing from the spirit and scope of the invention.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention. The reference numerals in the claims are used to more clearly illustrate the invention when considered with the figures and are not intended to limit the scope of the claims to the exact means so referred to by the respective numeral.

What is claimed is:

1. An automatic variable speed transmission, comprising:

an input shaft (12) with a first section (12A) and a second section (12B) for receiving rotational input;
an input sun gear (14) integrally formed between said first section (12A) and said second section (12B) of said input shaft to enable simultaneous rotation with said input shaft;
a medium speed control shaft (20) having a medium speed sun gear (22) integrally formed with an end (20A) and being rotatably and coaxially mounted on said first section (12A) of said input shaft to enable independent rotation about said input shaft;
a reverse rotation control shaft (30) having a reverse rotation sun gear (32) integrally formed with an end (30A) and being rotatably and coaxially mounted on said medium speed control shaft (20) to enable independent rotation about said medium speed control shaft;
a first carrier (40) coaxially mounted on said reverse rotation control shaft (30) near said reverse rotation sun gear (32) to enable independent rotation about said reverse rotation control shaft;
a second carrier (46) having a hollow cylinder part (44) and being coaxially mounted on said second section (12B) of said input shaft to enable independent rotation about said second section;
a plurality of locking pins (52A, 52B) secured to and interlinking said carriers (40, 46) to enable simultaneous rotation of said carriers (40, 46);
a plurality of input differential gears (54) with each said input differential gear being rotatably mounted on each said locking pin (52AA) and with the inner side of the rear half of each said input differential gear being meshed with said input sun gear (14);
a plurality of reverse rotation differential gears (58) with each said reverse rotation differential gear being integrally formed with each said input differential gear (54A) and being rotatably mounted on each said locking pin (52AA) and with the inner side of each said reverse rotational differential gear being meshed with said reverse rotation sun gear (32);
a plurality of medium speed differential gears (64) with each said medium speed differential gear being rotatably mounted on each said locking pin (52BB) and with the rear half and the inner side of the forward half of each said medium speed differential gear being meshed with the forward half of each said input differential gear (54A) and said medium speed sun gear (22), respectively;
an output shaft (50) integrally formed with said hollow cylinder part (44) of said carrier (46);
a low speed ring gear (70) rotatably mounted on said hollow cylinder part (44) of said carrier (46) and being smashed with the outer side of the rear half of each said input differential gear (54A);
a low speed brake means (80) for applying a braking force to said low speed control shaft (70) to provide a low speed driving;
a medium speed brake means (82) for applying a braking force to said medium speed control shaft (20) to provide a medium speed driving;
an interlocking means (90) for directly coupling the rotation of said input shaft (12) to said medium speed control shaft (20) so that they rotate simultaneously to provide a high speed driving; and
a reverse rotation brake means (84) for applying a braking force to said reverse rotation control shaft (30) to provide a reverse driving.

2. The automatic variable speed transmission of claim 1, wherein each brake means (80, 82) includes a one way clutch.

3. The automatic variable speed transmission of claim 1, wherein each said input and reverse rotation differential gears (54A, 58A) are integrally formed and have a different number of teeth relative to each other.

4. The automatic variable speed transmission of claim 1, wherein the number o teeth in a forward portion of each said medium speed differential gear (64A) is different than the number of teeth of a rear portion thereof.

5. The automatic variable speed transmission of claim 1, wherein a concave portion (62) is formed between said input and reverse rotation differential gears (54A, 58A).

6. The automatic variable speed transmission of claim 1, wherein busing (68, 68') are mounted on each locking pin (52BB) to prevent the axial movement of each said medium speed differential gear (64A).

7. An automatic variable speed transmission, comprising:
   an input shaft (12) with a first section (12A) and a second section (12B) for receiving rotation input;
   an input sun gear (14) integrally formed between said first section (12A) and said second section (12B) of said input shaft to enable simultaneous rotation with said input shaft;
   a medium speed control shaft (20) having a medium speed sun gear (22) integrally formed at an end (20A) of said control shaft (20) and being rotatably and coaxially mounted on said first section (12A) of said input shaft to enable independent rotation of said input shaft;
   a reverse rotation control shaft (30) having a reverse rotation sun gear (32) integrally formed at an end (30A) of said control shaft (30) and being rotatably and coaxially mounted on said medium speed control shaft (20) to enable independent rotation about said medium speed control shaft;
   a first carrier (40) coaxially mounted on said reverse rotation control shaft (30) near said reverse rotation sun gear (32) to enable independent rotation about said reverse rotation control shaft;
   a second carrier (46) having a hollow cylinder part (44) and being coaxially mounted on said second section (12B) of said input shaft to enable independent rotation about said second section;
   a plurality of locking pins (52A, 52B) secured to and interlinking together said carriers (40, 46) to enable simultaneous rotation of said carriers (40, 46);
   a plurality of input differential gears (54) with each said input differential gear (54A) being rotatably mounted on each said locking pin (52AA) and with the inner side of the rear half of each said input differential gear being mashed with said input sun gear (14);
   a plurality of reverse rotation differential gears (58) with each said reverse rotation differential gear (58A) being integrally formed with each said input differential gear (54A) and being rotatably mounted on each said locking pin (52AA) and with the inner side of each said reverse rotation differential gear being meshed with said reverse rotation sun gear (32);
   a plurality of medium speed differential gears (64) with each said medium speed differential gear (64A) being rotatably mounted on each said locking pin (52BB) and with the rear half and the inner side of the forward half of each said medium speed differential gear being mashed with the forward half of each said input differential gear (54A) and said medium speed sun gear (22), respectively;
   an output shaft (50) integrally formed with said hollow cylinder part (44) of said carrier (46);
   a medium speed brake means (82) for applying a braking force to said medium speed control shaft (20) to provide a low and medium speed driving;
   an interlocking means (90) for directly coupling the rotation of said input shaft (12) to said medium speed control shaft (20) so that they rotate simultaneously to provide high speed driving; and
   a reverse rotation brake means (84) for applying a braking force to said reverse rotation control shaft (30) to provide a reverse driving.

8. The automatic variable speed transmission of claim 7, wherein said interlocking means (90) utilizes a fluid clutch, torque converter, electric and electronic clutch.

9. The automatic variable speed transmission of claim 7, wherein said input and reverse rotation differential gears (54, 58) are integrally formed and have a different number of teeth relative to each other.

10. The automatic variable speed transmission of claim 7, wherein the number of teeth of a forward portion of each medium speed differential gear (64A) are different from those of a rear portion thereof.

11. The automatic variable speed transmission of claim 7, wherein a concave portion (6) is formed between said input and reverse rotation differential gears (54A, 58A).

12. The automatic variable speed transmission of claim 7, wherein bushings (68, 68') are mounted on each locking pin (52BB) to prevent axial movement of each medium speed differential gear (64A).

13. An automatic variable speed transmission, comprising:
   an input shaft (311) with a fist section (311A) and a second section (311B) for receiving rotational input;
   an input sun gear (313) integrally formed between said first section (311A) and said second section (311B) of said input shaft to enable simultaneous rotation with said input shaft;
   a reverse rotation control shaft (315) having a reverse rotation sun gear (314) integrally formed with an end (315A) and being rotatably and coaxially mounted on said first section (311A) of said input shaft to enable independent rotation about said input shaft;
   a first carrier (320) coaxially mounted on said reverse rotation control shaft (315) near said reverse rotation sun gear (314) to enable independent rotation about said reverse rotation control shaft;
   a second carrier (323) having a hollow cylinder part (322) and being coaxially mounted on said second section (311B) of said input shaft to enable independent rotation about said second section;
   a plurality of locking pins (325) secured to and interlinking said carriers (320, 323) to enable simultaneous rotation of said carriers (320, 323);
   a plurality of input planetary gears (326) with each said input planetary gear being rotatably mounted on each said locking pin (325A) and with the inner side of each said input planetary gear being meshed with said input sun gear (313);
   a plurality of reverse rotation planetary gears (327) with each said reverse rotation planetary gear being integrally formed with each said input planetary gear (326A) and being rotatably mounted on each said locking pin (325A) and with the inner side of each said reverse rotation planetary gear being meshed with said reverse rotation sun gear (314);

a low speed ring gear (331) rotatably mounted on said hollow cylinder part (322) of said carrier (323) and being meshed with the other side of each said input planetary gear (326A);

an output shaft (321) integrally formed with said hollow cylinder part (322) of said carrier (323);

a low speed brake means (333) for applying a braking force to said low speed ring gear (331) to provide a forward low speed driving;

an interlocking means (335) for directly coupling the rotation of said input shaft (311) to provide a forward low speed driving;

an interlocking means (335) for directly coupling the rotation of said input shaft (311) to said reverse rotation control shaft (315) so that they have e difference in rotation between them or they rotate simultaneously to provide a medium and a high speed driving; and a reverse rotation brake means (334) for applying a braking force to said reverse rotation control shaft (315) to provide a reverse driving.

14. The automatic variable speed transmission of claim 13, the number of teeth of each said input planetary gear (326A) is more than those of each said reverse rotation planetary gear (327A).

15. A continuous automatic transmission (10) comprising:

an input shaft (12) for receiving rotational input and which includes an input sun gear (14) secured to said input shaft (12) to enable simultaneous rotation with said input shaft (12);

a medium speed control shaft (20) coaxially positioned and rotatably secured to said input shaft (12) with said medium speed control shaft further including a medium speed sun gear (22) coaxially secured thereto tot enable independent rotation of said medium speed control shaft (20) and said sun gear (22) about said input shaft (12);

a reverse rotation control shaft (30) coaxially positioned and rotatably secured to said medium speed control shaft (20) with a reverse rotation sun gear (32) coaxially secured thereto to enable independent rotation of said reverse rotation control shaft (30) and said sun gear (32) about said medium speed control shaft (20);

a first carrier (40) coaxially portioned and rotatably secured to said reverse rotation control shaft (30) to enable independent rotation about said reverse rotation control shaft (30);

a second carrier (46) coaxially positioned and rotatably secured to said input shaft (12) to enable independent rotation about said input shaft (12) and with said second carrier (46) terminating in an output shaft (50);

at least one each of locking pins (52AA, 52BB) to interconnect and secure together each said first and second carriers (40, 46) to enable simultaneous rotation of said carriers about said reverse rotation control shaft (30) and said input shaft (12), respectively;

at least one input differential gear (54A) with each input differential gear (54A) being in mechanical communication with said input sun gear (14);

at least one reverse rotation differential gear (58A) with each reverse rotation differential gear (58A) interconnected to an input differential gear (54A) and with said interconnected reverse rotation differential gear (58A) and said input differential gear (54A) rotatably mounted on a locking pin (52AA) to enable simultaneous rotation of said interconnected gears (140) about said locking pin (52AA) and each said reverse rotation differential gear (58A) in mechanical communication with said reverse rotation sun gear (32);

at least one medium speed differential gear (64A) with each medium speed differential gear (64A) being rotatably secured on a locking pin (52BB);

a medium speed brake means (82) for applying rotational braking force to said medium speed control shaft (20) to provide medium rotational speed of said output shaft (50);

a reverse rotation brake means (84) for applying rotational braking force to said reverse rotation control shaft (30) to provide a reverse rotational output of said output shaft relative to the rotational input of said input shaft; and an interlocking means (90) for directly coupling rotational speed of said input shaft (11) and said medium speed control shaft (20) to provide high speed rotation of said output shaft.

16. The transmission of claim 15 further including a low speed ring gear (70) coaxially positioned and rotatably secured to said second carrier (46) to enable independent rotation about said second carrier (46);

each said input differential gear (54A) being in mechanical communication with said low speed ring gear (70); and a low speed brake means (80) for applying rotational braking force to said low speed ring gear (70) to provide low speed rotation of said output shaft (50).

17. A continuous automatic transmission (300) comprising:

an input shaft (311) for receiving rotational input and which includes an input sun gear (313) secured to said input shaft (311) to enable simultaneous rotation with said input shaft (311);

a reverse rotation control shaft (315) coaxially positioned and rotatably secured to said input shaft (311) and with a reverse rotation sun gear (314) coaxially secured there to enable independent rotation of said reverse rotation control shaft (315) and said sun gear (314) about said input shaft (311);

a first carrier (320) coaxially positioned and rotatably secured to said reverse rotation control shaft (315) to enable independent rotation about said reverse rotation control shaft (315);

a second carrier (323) coaxially positioned and rotatably secured to said input shaft (311) to enable independent rotation about said input shaft (311) and with said second carrier (323) terminating in an output shaft (321);

at least one locking pin (325A) to interconnect and secure together each said first and second carriers (320, 321) to enable simultaneous rotation of said carriers about said reverse rotation control shaft (315) and said input shaft (311), respectively;

at least one input planetary gear (326A) with each input planetary gear (326A) in mechanical communication with said input sun gear (313);

at least one reverse rotation planetary gear (327A) with each reverse rotation planetary gear (327A) interconnected to an input planetary gear (326A) and with said interconnected reverse rotation planetary gear (327A) and said input planetary gear (326A) rotatably mounted on a locking pin (325A) to enable simultaneous rotation of said interconnected gears (340) about said locking pin (325A) and each said reverse rotation planetary gear (327A) in mechanical communication with said reverse rotation sun gear (314);

a low speed ring gear (331) coaxially positioned and rotatably secured to said second carrier (323) to enable independent rotation about said second carrier (323);

a low speed brake means (333) for applying to rational braking force to said low speed ring gear (331) to initiate rotation of said output shaft (321) and to provide low speed rotation of said output shaft (321);

a reverse rotation brake means (334) for applying rotational braking force to said reverse rotation control shaft (315) to provide a reverse rotational output of said output shaft relative to the rotational input to said input shaft; and an interlocking means (335) for coupling rotational speed of said input shaft (311) and said reverse rotation control shaft (315) to provide medium and high speed rotation of said output shaft.

* * * * *

UNITED STATES PATENT AND TRADEMARK OFFICE
CERTIFICATE OF CORRECTION

PATENT NO. : 5,330,395

DATED : July 19, 1994

INVENTOR(S) : Ra et al.

Page 1 of 2

It is certified that error appears in the above-indentified patent and that said Letters Patent is hereby corrected as shown below:

Col. 18, line 49 "smashed" should read --meshed--

Col. 19, line 4 "o" should read --of--

Col. 19, line 51 "mashed" should read --meshed--

Col. 19, line 66 "mashed" should read --meshed--

Col. 20, line 25 "(6)" should read --(62)--

Col. 21, line 17 "e" should read --a--

Col. 21, line 48 "portioned" should read --positioned--

UNITED STATES PATENT AND TRADEMARK OFFICE
CERTIFICATE OF CORRECTION

PATENT NO. : 5,330,395
DATED : July 19, 1994
INVENTOR(S) : Ra et al.

It is certified that error appears in the above-indentified patent and that said Letters Patent is hereby corrected as shown below:

Col. 22, line 45 "there" should read --thereto--

Col. 22, line 59 "(320,321)" should read --(320,323)--

Col. 23, lines 12 and 13 "to rational" should read --rotational--

Signed and Sealed this

Seventeenth Day of December, 1996

Attest:

BRUCE LEHMAN

Attesting Officer     Commissioner of Patents and Trademarks